(12) United States Patent
Ogata et al.

(10) Patent No.: US 9,881,218 B2
(45) Date of Patent: Jan. 30, 2018

(54) LOCATION CALCULATION SYSTEM AND NON-TRANSITORY COMPUTER-READABLE MEDIUM

(71) Applicant: ZENRIN Co., LTD., Kitakyushu-shi (JP)

(72) Inventors: Shinji Ogata, Fukuoka (JP); Hiroyuki Ohara, Kitakyushu (JP); Hiroyuki Inatsuka, Kitakyushu (JP); Tatsuya Yuba, San Bruno, CA (US); Junichi Nakamura, Kitakyushu (JP)

(73) Assignee: ZENRIN Co., LTD., Kitakyushu-shi (JP)

( * ) Notice: Subject to any disclaimer, the term of this patent is extended or adjusted under 35 U.S.C. 154(b) by 201 days.

(21) Appl. No.: 14/815,645

(22) Filed: Jul. 31, 2015

(65) Prior Publication Data

US 2016/0063341 A1  Mar. 3, 2016

(30) Foreign Application Priority Data

Aug. 29, 2014 (JP) ................................. 2014-175912

(51) Int. Cl.
| | |
|---|---|
| G06K 9/00 | (2006.01) |
| H04N 5/225 | (2006.01) |
| H04N 5/232 | (2006.01) |
| G01S 19/45 | (2010.01) |
| G06T 7/73 | (2017.01) |

(52) U.S. Cl.
CPC .......... G06K 9/00798 (2013.01); G01S 19/45 (2013.01); G06K 9/00791 (2013.01); G06K 9/00818 (2013.01); G06K 9/00825 (2013.01); G06T 7/74 (2017.01); H04N 5/225 (2013.01);
(Continued)

(58) Field of Classification Search
CPC ........... G06K 9/00791; G06K 9/00798; G06K 9/00825
See application file for complete search history.

(56) References Cited

U.S. PATENT DOCUMENTS 7,868,821 B2 * 1/2011 Hoshizaki ............... G01S 19/45
 342/357.42
2005/0135658 A1 * 6/2005 Yamamoto ......... G06K 9/00798
 382/104
(Continued)

FOREIGN PATENT DOCUMENTS

JP 2005-265494 9/2005

*Primary Examiner* — Utpal Shah
(74) *Attorney, Agent, or Firm* — Oblon, McClelland, Maier & Neustadt, L.L.P.

(57) ABSTRACT

A location calculation system that includes circuitry that stores vector information regarding a plurality of first vectors each connecting a specific point-relevant location, that is associated with each of a plurality of specific points set along a road, with a location of a predetermined feature, in relation to position information regarding each position of the plurality of specific points; stores predetermined feature location information regarding the location of the predetermined feature; obtains image data ahead of a moving body; calculates a location of the predetermined feature in an image of the image data as obtained by the circuitry; calculates a location of the moving body based on the location of the predetermined feature as calculated by the circuitry and the vector information; and outputs the location of the moving body as calculated by the circuitry.

17 Claims, 17 Drawing Sheets

(52) U.S. Cl.
CPC .................... *H04N 5/23229* (2013.01); *G06T 2207/30252* (2013.01)

(56) References Cited

U.S. PATENT DOCUMENTS

| | | | | |
|---|---|---|---|---|
| 2014/0003709 | A1* | 1/2014 | Ranganathan | G06K 9/00798 382/159 |
| 2015/0310283 | A1* | 10/2015 | Mori | B60W 30/12 382/104 |
| 2016/0101779 | A1* | 4/2016 | Katoh | G06T 7/60 340/435 |
| 2017/0008521 | A1* | 1/2017 | Braunstein | G01C 21/32 |

\* cited by examiner

| SPECIFIC POINT ID | POSITION INFO | FIRST VECTOR | OBJECT FEATURE ID |
|---|---|---|---|
| p1 | (X1,Y1,Z1) | (dx1,dy1,dz1) | L1 |
| p2 | (X2,Y2,Z2) | (dx2,dy2,dz2) | L1 |
| p3 | (X3,Y3,Z3) | (dx3,dy3,dz3) | L1 |

| FEATURE ID | LOCATION INFO | SHAPE | SIZE | POLYGON ID |
|---|---|---|---|---|
| L1 | (Xl1,Yl1,Zl1) | CIRCLE | R=300mm | PG1 |
| L2 | (Xl2,Yl2,Zl2) | SQUARE | 900*900mm | PG2 |

Fig.9

SECOND EMBODIMENT

| SPECIFIC POINT ID | POSITION INFO | FOURTH VECTOR | OBJECT FEATURE ID |
|---|---|---|---|
| p1 | (X1,Y1,Z1) | (dx7,dy7,dz7) | L1 |
| p2 | (X2,Y2,Z2) | (dx8,dy8,dz8) | L1 |
| p3 | (X3,Y3,Z3) | (dx9,dy9,dz9) | L1 |

THIRD EMBODIMENT

THIRD EMBODIMENT

Fig.14

FOURTH EMBODIMENT

| SPECIFIC POINT ID | POSITION INFO | FIRST VECTOR | OBJECT FEATURE ID | ANGLES |
|---|---|---|---|---|
| p5 | (X5,Y5,Z5) | (dx5,dy5,dz5) | L11 | ($\theta$x5, $\theta$y5, $\theta$z5) |
| p6 | (X6,Y6,Z6) | (dx6,dy6,dz6) | L11 | ($\theta$x6, $\theta$y6, $\theta$z6) |
| p7 | (X7,Y7,Z7) | (dx7,dy7,dz7) | L11 | ($\theta$x7, $\theta$y7, $\theta$z7) |
| p8 | (X8,Y8,Z8) | (dx8,dy8,dz8) | L11 | ($\theta$x8, $\theta$y8, $\theta$z8) |

FIFTH EMBODIMENT

LOCATION CALCULATION SYSTEM AND NON-TRANSITORY COMPUTER-READABLE MEDIUM

CROSS-REFERENCE TO RELATED APPLICATIONS

The present application claims priority from Japanese Patent Application No. 2014-175912 filed on Aug. 29, 2014, the entirety of disclosure of which is hereby incorporated by reference into this application.

BACKGROUND

Technical Field

The present disclosure relates to specifying the location of a vehicle.

Description of the Related Art

A proposed apparatus analyzes an image taken by a vehicle-mounted camera and specifies the current location of a vehicle during driving. For example, a proposed apparatus stores in advance information regarding road marking lines representing boundaries of lanes and map information including information regarding landmarks such as road surface markings and signs, analyzes a taken image to extract landmarks and road marking lines, and identify a location of highest matching with the extracted landmarks and road marking lines in a map indicated by the map information.

The prior art apparatus described above, however, analyzes the entire taken image for extraction of landmarks and road marking lines and accordingly has a problem of increasing the processing load and requiring the long time for specifying the location of the vehicle. This may lead to a problem of delayed control of steering or power output in an application that automatically controls the steering or the power output of the vehicle based on the specified location of the vehicle. This problem is not limited to the vehicle-mounted camera but is commonly found in any location specifying apparatus that analyzes an image obtained by a reflected wave of any wavelength, for example, a millimeter waveband radar or a laser to specify the location of the vehicle.

SUMMARY

According to one aspect of the disclosure, there is provided a location calculation system that includes circuitry that stores vector information regarding a plurality of first vectors each connecting a specific point-relevant location, that is associated with each of a plurality of specific points set along a road, with a location of a predetermined feature, in relation to position information regarding each position of the plurality of specific points; stores predetermined feature location information regarding the location of the predetermined feature; obtains image data ahead of a moving body; calculates a location of the predetermined feature in an image of the image data as obtained by the circuitry; calculates a location of the moving body based on the location of the predetermined feature as calculated by the circuitry and the vector information; and outputs the location of the moving body as calculated by the circuitry.

The disclosure may be implemented by various other aspects, for example, a vehicle control apparatus, a drive assist system, a vehicle, a method of specifying location of a vehicle, a computer program implementing each of these apparatuses and methods, and a non-transitory recording medium storing such a computer program.

BRIEF DESCRIPTION OF DRAWINGS

FIG. 9 is a diagram illustrating one example of settings in the vector table of the second embodiment;

FIG. 14 is a diagram showing one example of settings in a vector table according to a fourth embodiment;

DESCRIPTION OF EMBODIMENTS

A. First Embodiment

A1. Configuration of Apparatus

Figure 1:
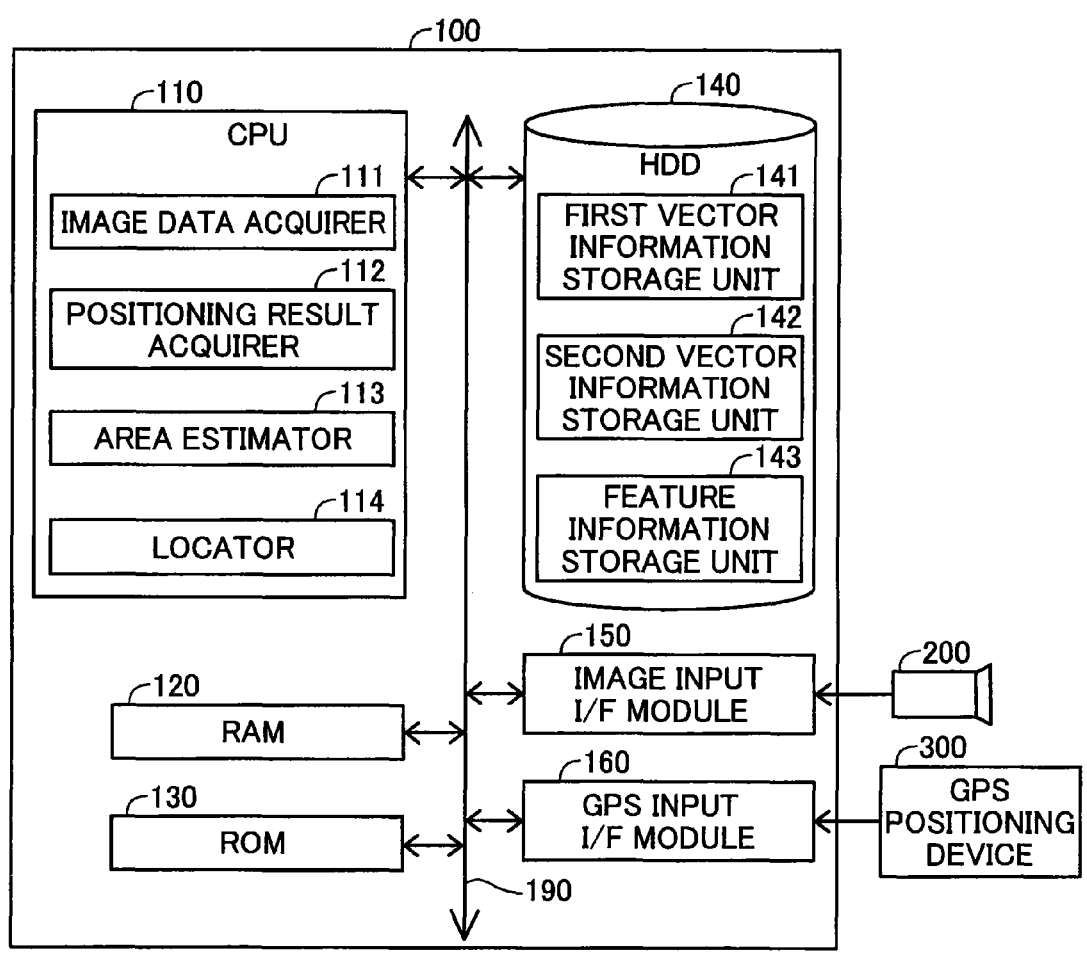
FIG. 1 is a block diagram illustrating the schematic configuration of a location specifying apparatus 100 according to one embodiment of the disclosure.

FIG. 1 is a block diagram illustrating the schematic configuration of a location specifying apparatus 100 according to one embodiment of the disclosure. The location specifying apparatus 100 shown in FIG. 1 is mounted on a vehicle (not shown) to specify the location of the vehicle. The vehicle may perform automatic control of steering or power output, give an alarm to the driver or perform route search or route guidance, based on the location specified by the location specifying apparatus 100. The term "vehicle" here denotes any vehicle enabled to run on the road, for example, a motor truck, taxi, bus, motorbike or a bicycle.

As shown in FIG. 1, the location specifying apparatus 100 includes a Central Processing Unit (CPU) 110, a Random Access Memory (RAM) 120, a Read Only Memory (ROM) 130, a hard disk drive 140, an image input interface (I/F) module 150 and a GPS input interface (I/F) module 160. These components are respectively connected with an internal bus 190.

The CPU 110 performs a control program stored in the ROM 130 to serve as an image data acquirer 111, a positioning result acquirer 112, an area estimator 113 and a locator 114.

The image data acquirer 111 obtains image data of an image taken by an imaging camera 200 and stores the obtained image data in the hard disk drive 140. According to this embodiment, the imaging camera 200 is a digital video camera having a Charge Coupled Device (CCD) and obtains video data (image data) in a specified number of pixels. According to this embodiment, the imaging camera 200 is mounted on the vehicle to have an imaging range ahead of the vehicle.

The positioning result acquirer 112 obtains information regarding the current location (latitude, longitude and altitude) as the positioning result by a Global Positioning System (GPS) positioning device 300. The GPS positioning device 300 is a known device that computes the current location based on signals output from global positioning system (GPS) satellites, and is thus not specifically described herein. According to this embodiment, the location of the vehicle is specified as the location of the GPS positioning device 300 mounted on the vehicle. According to this embodiment, the locations at which the imaging camera 200 and the GPS positioning device 300 are installed in the vehicle are fixed and are not changed.

The area estimator 113 estimates an existing area where an object feature exists in the taken image in a vehicle location specifying process described later. The object feature and the existing area will be described later in detail.

The hard disk drive 140 includes a first vector information storage unit 141, a second vehicle information storage unit 142 and a feature information storage unit 143. The first vehicle information storage unit 141 stores in advance information regarding first vectors associated with respective specific points described later, in the form of a vector table.

Figures 2, 3, 4:
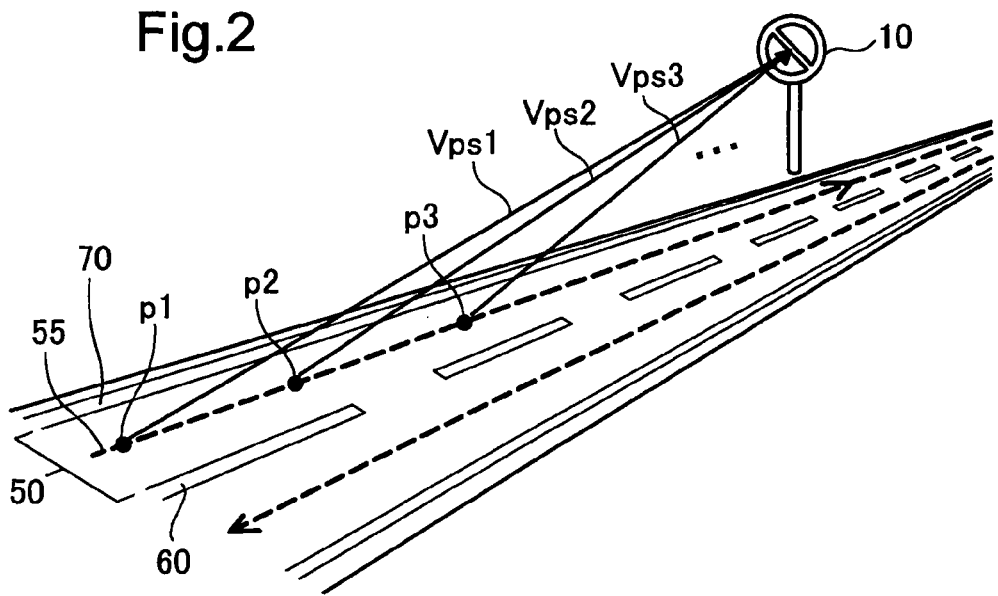
FIG. 2 is a diagram illustrating first vectors according to the first embodiment.
FIG. 3 is a diagram showing one example of settings in the vector table stored in the first vector information storage unit 141 shown in FIG. 1.
FIG. 4 is a diagram showing an example of settings in the feature table stored in the feature information storage unit 143 shown in FIG. 1.

FIG. 2 is a diagram illustrating first vectors according to the first embodiment. In this embodiment, points where vector information is set (hereinafter referred to as "specific points") are set at predetermined intervals with respect to each lane where the vehicle runs. More specifically, as shown in FIG. 2, specific points are set on a middle line 55 of a lane 50 located between a center line 60 and a curbstone 70 at predetermined intervals along the middle line 55. For convenience of illustration, only three specific points p1, p2 and p3 are shown in FIG. 2. A sign 10 is placed near outside of the lane 50 to be visible from vehicles running on the lane 50. The sign 10 has a circular shape in planar view. The shape, the design and the location of the sign 10 are unlikely to change. Accordingly, the sign 10 is used as a landmark in the process of specifying the location of the vehicle. In addition to the sign 10, another sign different from the sign 10, a power pole or a road surface marking may also be used as a landmark in the process of specifying the location of the vehicle. According to this embodiment, a feature used as a landmark in the process of specifying the location of the vehicle as described above (hereinafter called "object feature") is set in advance related to each specific point.

According to this embodiment, with respect to each of the specific points, a vector directed from the specific point to the landmark is set as a first vector Vps. More specifically, for example, with respect to a specific point p1, a vector directed from the specific point p1 to the sign 10 is set as a first vector Vps1. Similarly, with respect to a specific point p2, a vector directed from the specific point p2 to the sign 10 is set as a first vector Vps2. With respect to a specific point p3, a vector directed from the specific point p3 to the sign 10 is set as a first vector Vps3. According to this embodiment, the position of the end point of each first vector is set at a center point of a representative surface of the sign 10. This "representative surface of the sign 10" denotes a surface on which a mark as the sign is shown, so as to serve as a landmark.

FIG. 3 is a diagram showing one example of settings in the vector table stored in the first vector information storage unit 141 shown in FIG. 1. The vector table includes a "specific point identifier" field, a "position information" field, a "first vector" field and an "object feature identifier" field. The specific point identifier field stores identifiers of the respective specific points. The position information field stores position information (latitude, longitude and altitude) of the respective specific points. The first vector field stores information regarding first vectors associated with the respective specific points. The object feature identifier field stores an identifier of each object feature. In the example of FIG. 3, the vector table has registry of three records set with respect to the three specific points p1 to p3 shown in FIG. 2. More specifically, the topmost record of FIG. 3 is a record regarding the specific point p1 and includes the settings of "p1" as the identifier of the specific point p1, "X1,Y1,Z1" as the position information of the specific point p1, "dx1,dy1,dz1" as the first vector of the specific point p1 (more specifically, as the first vector Vps1 directed from the specific point p1 to the sign 10), and "L1" as the identifier of the object feature (more specifically, the sign 10) related to the specific point p1. Similarly, the second top record of FIG. 3 is a record regarding the specific point p2, and the third top record of FIG. 3 is a record regarding the specific point p3. The settings of the vector table are specified in advance by an administrator. The feature used as the object feature is set by the administrator as a feature that is likely to be included in an image taken by the imaging camera 200 when the vehicle is located near the relevant specific point. The values of the respective fields in FIG. 3 are given as typical values.

The second vector information storage unit 142 shown in FIG. 1 stores information regarding second vectors. According to this embodiment, the second vector denotes a vector directed from the GPS positioning device 300 to the imaging camera 200.

The feature information storage unit 143 shown in FIG. 1 stores information regarding features such as signs placed near the road and road surface markings (hereinafter referred to as "feature information") in the form of a feature table.

FIG. 4 is a diagram showing an example of settings in the feature table stored in the feature information storage unit 143 shown in FIG. 1. The feature table includes a "feature identifier" field, a "location information" field, a "shape" field, a "size" field and a "polygon identifier" field. The feature identifier field stores identifiers of respective features. The location information field stores location information (latitude, longitude and altitude) of the respective features. The shape field stores external shapes of representative surfaces of the respective features. The size field stores information regarding sizes of the representative surfaces of the respective features. The polygon identifier field stores identifiers of polygons representing the respective features. Polygon data of the respective features are related to the above polygon identifiers and are stored in the hard disk drive 140. In the example of FIG. 4, the feature table has registry of two records. The record with the feature identifier "L1" is a record regarding the sign 10 and includes the settings of "XI1,YI1,ZI1" as the location information of the sign 10, "circle" as the shape of the sign 10, "R (radius)=300 mm" as the size of the sign 10, and "PG1" as the polygon identifier of the sign 10. The record with the feature identifier "L2" is a record regarding a square sign (for example, a sign indicating the direction of each lane) and includes the settings of "XI2,YI2,ZI2" as the location information, "square" as the shape, "900 mm×900 mm" as the size and "PG2" as the polygon identifier.

The positioning result by the GPS positioning device 300 inevitably includes some error, so that the current location of the vehicle may not be accurately specified using only the positioning result by the GPS positioning device 300. Accordingly, the location specifying apparatus 100 of the first embodiment performs a vehicle location specifying process described later, in order to specify the current location of the vehicle accurately.

The image input interface module 150 shown in FIG. 1 has an interface for connection with the imaging camera 200 and sends image data obtained by the imaging camera 200 to the CPU 110 via the internal bus 190. The GPS input interface module 160 has an interface for connection with the GPS positioning device 300 and sends information regarding the positioning result by the GPS positioning device 300 to the CPU 110 via the internal bus 190.

The position of a specific point in this embodiment corresponds to the specific point-relevant location in the claims. The first vector information storage unit 141 corresponds to the first vector information storage unit in the claims. The image data obtained by the imaging camera 200 corresponds to the image data ahead of the moving body in the claims. The GPS positioning device 300 corresponds to the location sensor in the claims. The positioning result acquirer 112 corresponds to the location information acquirer in the claims. The CCD of the imaging camera 200 corresponds to the receiver in the claims. The feature information storage unit 143 corresponds to the predetermined feature location information storage unit and the shape information storage unit in the claims.

A2. Vehicle Location Specifying Process

Figure 5:
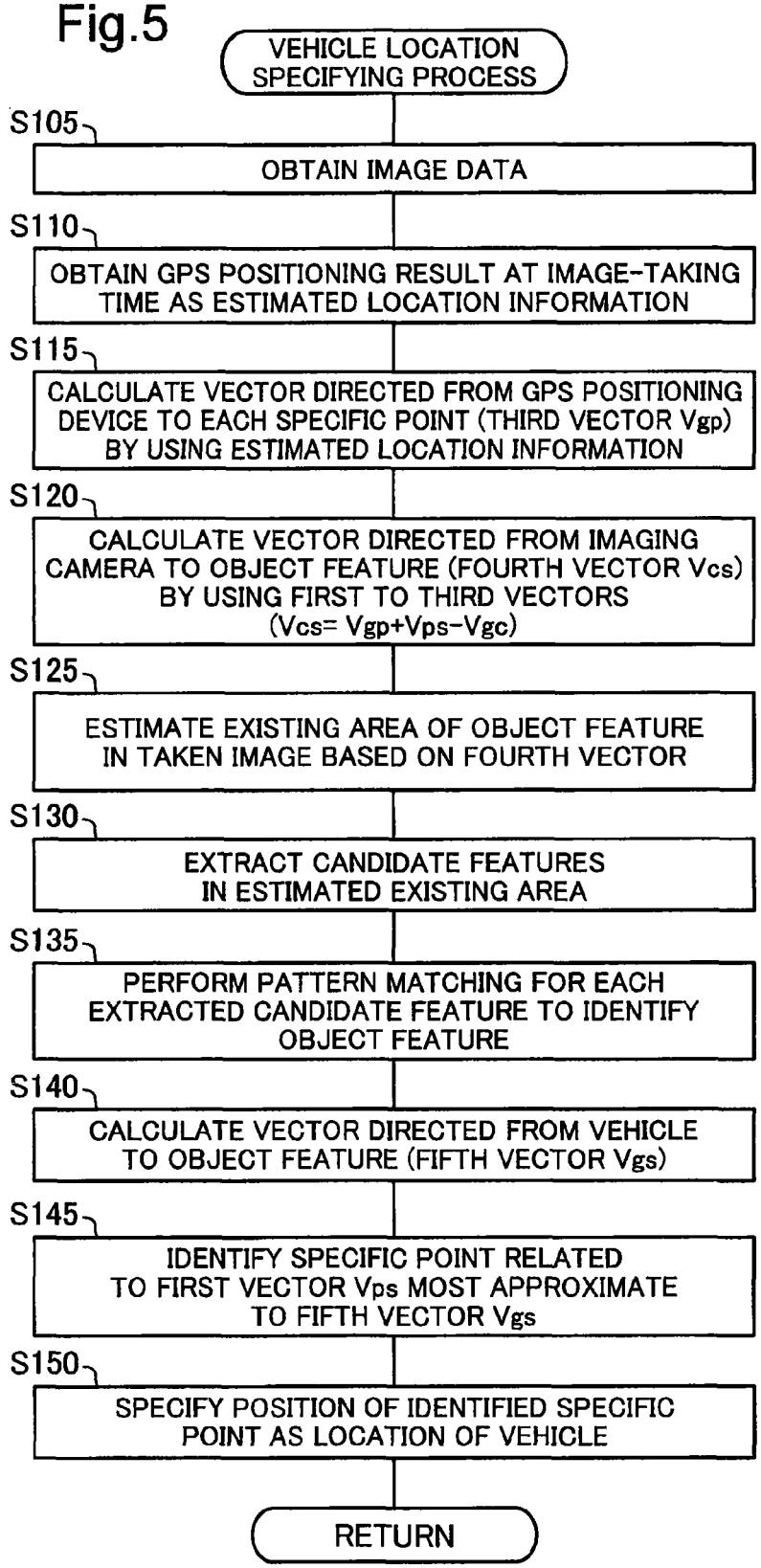
FIG. 5 is a flowchart showing a procedure of vehicle location specifying process according to the first embodiment.

FIG. 5 is a flowchart showing a procedure of vehicle location specifying process according to the first embodiment. After the power-on, the vehicle location specifying process is performed repeatedly in the location specifying apparatus 100. The image data acquirer 111 first controls the imaging camera 200 to take a still image and obtains image data of the taken still image (step S105).

The positioning result acquirer 112 obtains a positioning result by the GPS positioning device 300 at the image-taking time as information regarding the estimated current location of the vehicle when the image data is obtained (hereinafter referred to as "estimated location information") (step S110). As described above, the GPS positioning includes some error, so that the procedure of the embodiment treats the positioning result of the GPS positioning device 300 as the estimated current location of the vehicle.

The area estimator 113 uses the estimated location information obtained at step S110 and calculates vectors directed from the GPS positioning device 300 to the respective specific points (hereinafter referred to as "third vectors Vgp") (step S115).

Figure 6:
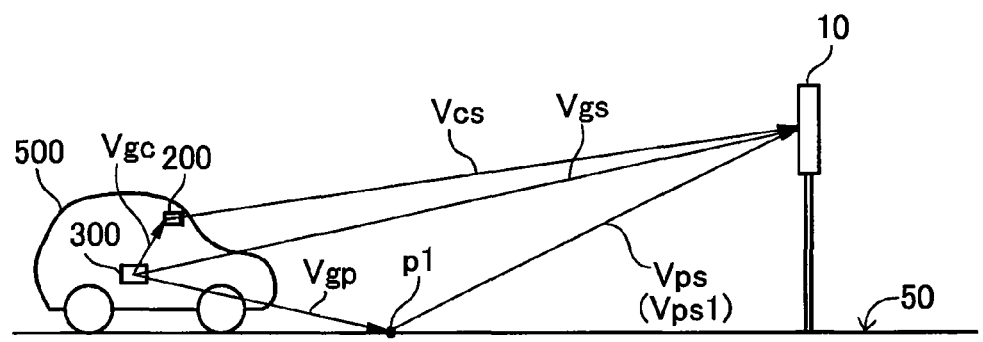
FIG. 6 is a diagram illustrating a third vector Vgp according to the first embodiment.

FIG. 6 is a diagram illustrating a third vector Vgp according to the first embodiment. FIG. 6 illustrates a side view of a vehicle 500 running on the lane 50 and the sign 10. FIG. 6 shows only a third vector Vgp directed from the GPS positioning device 300 to the specific point p1 as a representative of the third vectors Vgp directed from the GPS positioning device 300 to the respective specific points. FIG. 6 also shows the first vector Vps (Vps1) described above (vector directed from the specific point p1 to the sign 10) and a second vector Vgc (vector directed from the GPS positioning device 300 to the imaging camera 200), in addition to the third vector Vgp. FIG. 6 also shows a fourth vector Vcs and a fifth vector Vgs described later, in addition to the first to the third vectors. The details of the fourth and the fifth vectors will be described later.

The position information of the respective specific points is stored in the vector table shown in FIG. 3, and the location of the GPS positioning device 300 (estimated location when the image data is obtained) is obtained at step S110. At step S115, the third vectors Vgp are calculated based on the positions of the respective specific points and the estimated location. More specifically, at step S115, the area estimator 113 calculates third vectors Vgp with regard to only specific points in a predetermined area (for example, a circular area with a radius of 50 m) about the location indicated by the estimated location information obtained at step S110. In a modified procedure, the area estimator 113 may calculate a third vector Vgp with regard to only a specific point nearest to the location indicated by the estimated location information (hereinafter referred to as "nearest point"). Accordingly, at step S115, the area estimator 113 may calculate a third vector Vgp directed from the GPS positioning device 300 to each specific point near to the location indicated by the estimated location information.

Referring back to FIG. 5, the area estimator 113 uses the first to the third vectors to calculate a vector directed from the imaging camera 200 to the sign 10 (fourth vector Vcs mentioned above) (step S120). More specifically, the area estimator 113 calculates the fourth vector Vcs by summing up the third vector Vgp and the first vector Vps shown in FIG. 6 and subtracting the second vector Vgc from the sum. As described above, the third vectors Vgp are calculated with regard to the specific points in the predetermined area about the location indicated by the estimated location information, so that a plurality of fourth vectors Vcs may be calculated based on these third vectors Vgp. At step S120, the area estimator 113 determines a mean vector of the plurality of fourth vectors Vcs and uses the determined mean vector as the fourth vector Vcs for the processing of and after step S125.

Referring back to FIG. 5, the area estimator 113 estimates an area where an object feature exists (hereinafter referred to as "existing area") in the taken image, based on the fourth vector Vcs calculated at step S120 (step S125). More specifically, in the procedure of the embodiment the area estimator 113 estimates either a right half area or a left half area of the taken image as the existing area. This existing area corresponds to the predetermined feature existing area in the claims.

Figure 7:
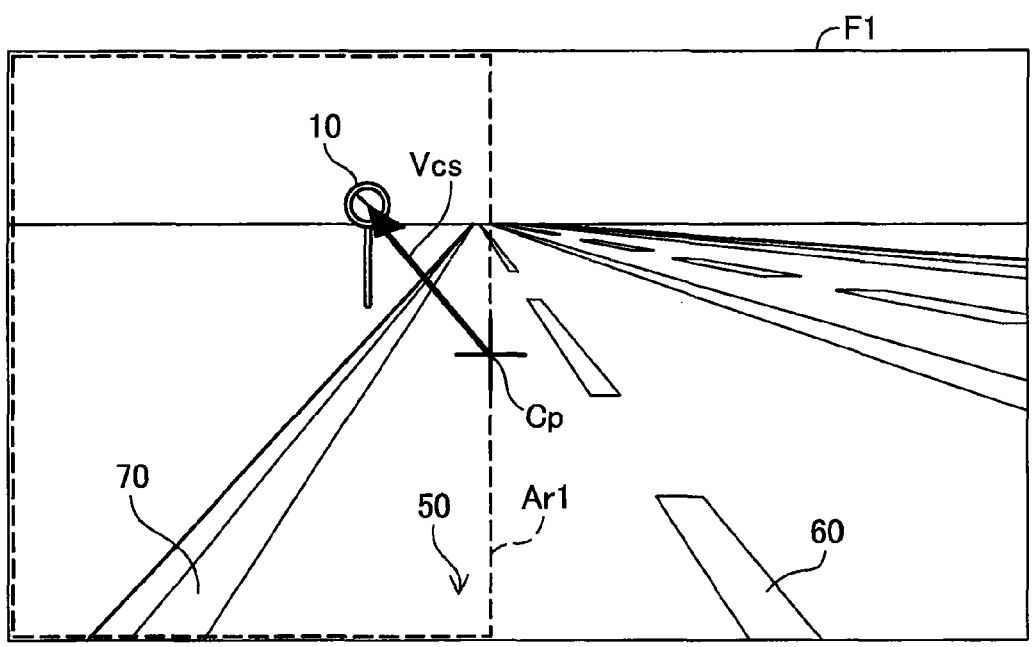
FIG. 7 is a diagram illustrating one example of the existing area estimated at step S125.

FIG. 7 is a diagram illustrating one example of the existing area estimated at step S125. For convenience of explanation, FIG. 7 shows a fourth vector Vcs included in an image F1 obtained at step S105. In the illustrated example of FIG. 7, the fourth vector Vcs is given as a vector directed from center Cp of the image F1 to the sign 10. At step S125, the area estimator 113 determines a projection vector of the fourth vector Vcs to a plane perpendicular to the moving direction of the vehicle, i.e., a plane perpendicular to the middle line 55 and identifies whether the projection vector is a vector directed rightward relative to the moving direction of the vehicle or a vector directed leftward relative to the moving direction of the vehicle. The area estimator 113 estimates the right half area of the taken image as the existing area when identifying the projection vector as a vector directed rightward, and estimates the left half area of the taken image as the existing image when identifying the projection vector as a vector directed leftward. In the example of FIG. 7, the projection vector of the fourth vector Vcs is identified as a vector directed leftward relative to the moving direction of the vehicle, so that a left half area Ar1 of the image F1 is estimated as the existing area.

Referring back to FIG. 5, the locator 114 extracts features that are possible candidates for the object feature (hereinafter referred to as "candidate features") in the existing area estimated at step S125, from the taken image (step S130). In an exemplary procedure, the CPU 110 may register in advance profile patterns of features that are possibly selected as the object feature. At step S130, the locator 114 may extract profiles by, for example, edge extraction, in the image and compare the extracted profiles with the registered profile patterns to extract the candidate features.

The locator 114 performs pattern matching for each of the candidate features extracted at step S130 with the polygons of object features related to the respective specific points, so as to identify the object feature included in the taken image (step S135).

The locator 114 subsequently calculates a vector directed from the vehicle (GPS positioning device 300) to the object feature identified at step S135 (fifth vector Vgs mentioned above) (step S140). As described above, the location information of the respective features are registered in the feature table shown in FIG. 4. The locator 114 accordingly uses this location information and the estimated location information obtained at step S110 to determine the fifth vector Vgs.

The locator 114 refers to the vector table, compares the fifth vector Vgs calculated at step S140 with the respective first vectors Vps to identify the first vector Vps most approximate to the fifth vector Vgs and then identifies a specific point related to the identified first vector Vps (step S145).

The locator 114 then specifies the position of the specific point identified at step S145, as the location of the vehicle (step S150).

The location specifying apparatus 100 of the first embodiment described above estimates an existing area of the object feature in the taken image and makes only the estimated existing area subjected to the extraction process of candidate features. This configuration reduces the processing load of the CPU 110 and shortens the time required for specifying the location of the vehicle, compared with a configuration that makes the entire area of the taken image subjected to the extraction process of candidate features. The location specifying apparatus 100 of the first embodiment calculates the vector directed from the imaging camera 200 to the sign 10 (fourth vector Vcs) and estimates the existing area based on the calculated vector. This enables the area where the sign 10 is included in the taken image to be estimated with high accuracy.

The location specifying apparatus 100 of the first embodiment stores the position information of the respective specific points and stores the information regarding the first vectors Vps associated with the respective specific points. This enables the fourth vector Vcs to be calculated with high accuracy by using the first vectors Vps.

The location specifying apparatus 100 of the first embodiment also stores the location information of the object feature and thereby enables the vector directed from the vehicle (GPS positioning device 300) to the sign 10 (fifth vector Vgs) to be calculated when the object feature is identified. Additionally, the first vector Vps related to a specific point closer to the current location of the vehicle is more approximate to the calculated fifth vector Vgs. The location specifying apparatus 100 of the first embodiment accordingly specifies the position of the specific point related to the first vector Vps most approximate to the fifth vector Vgs, as the location of the vehicle. This enables the location of the vehicle to be specified with high accuracy.

B. Second Embodiment

Figure 8:
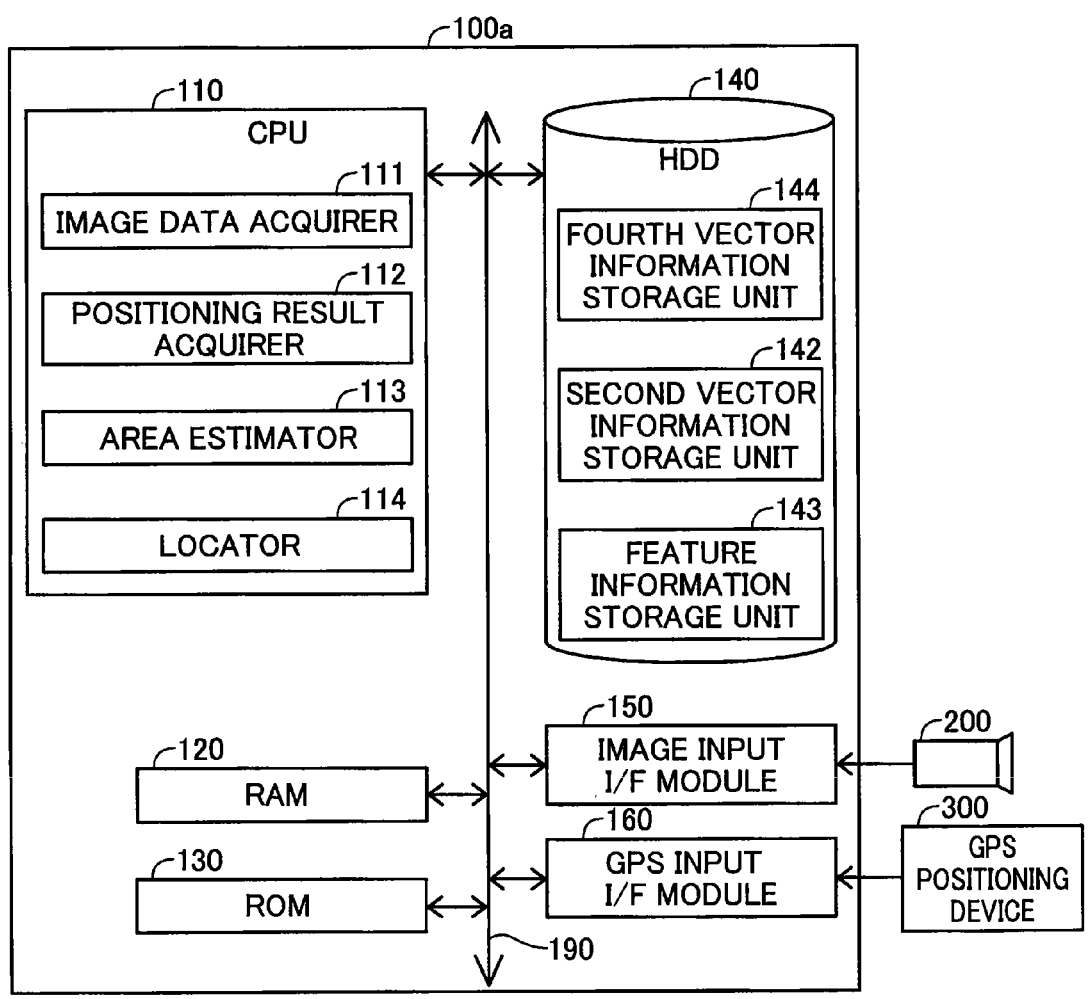
FIG. 8 is a block diagram illustrating the schematic configuration of a location specifying apparatus 100a according to a second embodiment.

FIG. 8 is a block diagram illustrating the schematic configuration of a location specifying apparatus 100a according to a second embodiment. The location specifying apparatus 100a of the second embodiment differs from the location specifying apparatus 100 of the first embodiment shown in FIG. 1 by that the hard disk drive 140 includes a fourth vector information storage unit 144 in place of the first vector information storage unit 141. Otherwise the configuration of the location specifying apparatus 100a of the second embodiment is similar to the configuration of the location specifying apparatus 100 of the first embodiment. The like components are expressed by the like symbols and are not specifically described.

The fourth vector information storage unit 144 stores in advance information regarding fourth vectors Vcs associated with the respective specific points, in the form of a vector table.

FIG. 9 is a diagram illustrating one example of settings in the vector table of the second embodiment. The vector table of the second embodiment differs from the vector table of the first embodiment shown in FIG. 3 by replacement of the first vector field with a fourth vector field. Otherwise the configuration of the vector table of the second embodiment is similar to the configuration of the vector table of the first embodiment and is thus not specifically described. As shown in FIG. 9, in the vector table of the second embodiment, information regarding fourth vectors is set in relation to respective specific points. In this embodiment, vectors directed from the imaging camera 200 to an object feature when the vehicle (GPS positioning device 300) is located vertically above respective specific points are set as fourth vectors Vcs in the vector table. These fourth vectors Vcs are set in advance in the vector table by the administrator.

Figure 10:
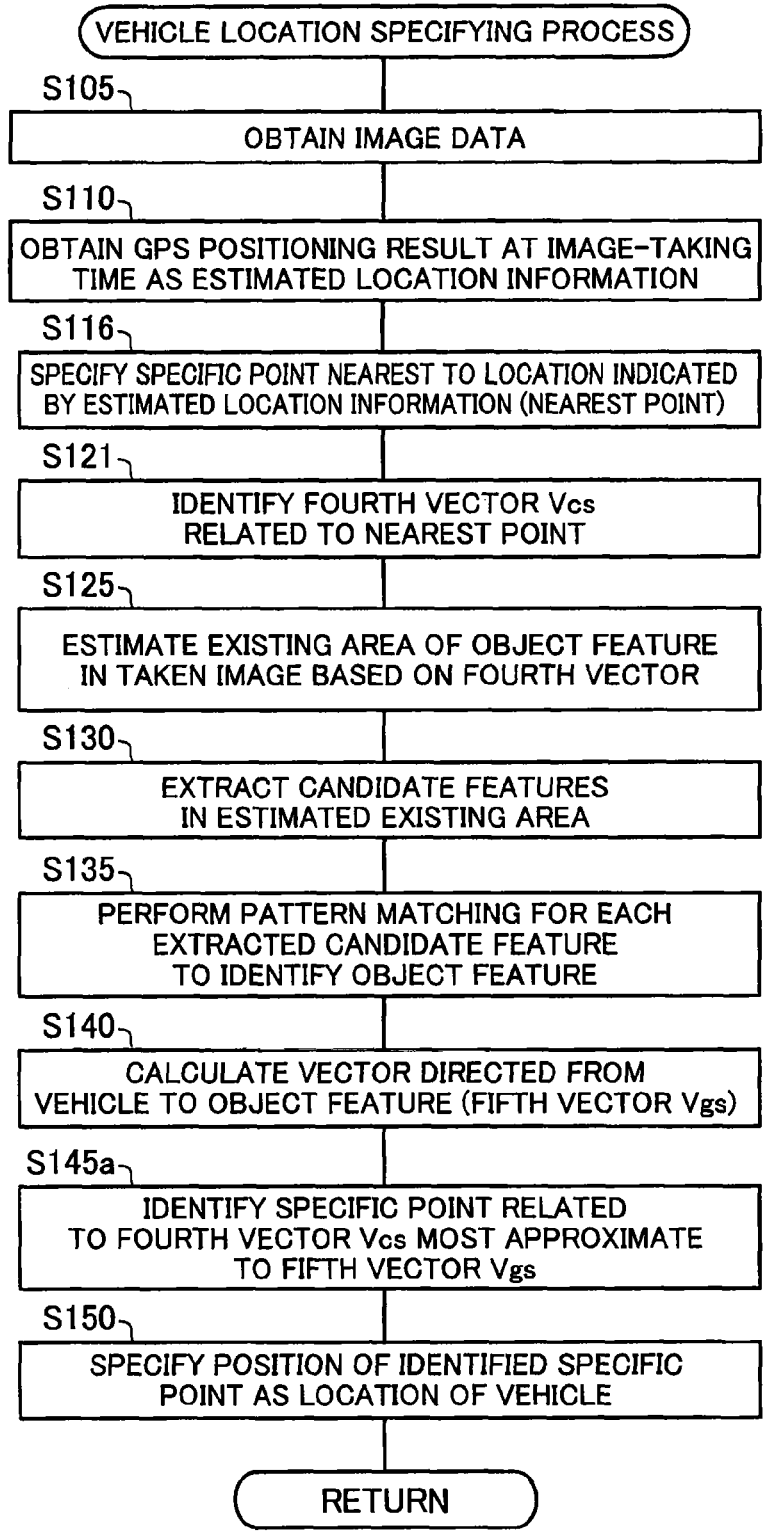
FIG. 10 is a flowchart showing a procedure of vehicle location specifying process according to the second embodiment.

FIG. 10 is a flowchart showing a procedure of vehicle location specifying process according to the second embodiment. The vehicle location specifying process of the second embodiment differs from the vehicle location specifying process of the first embodiment shown in FIG. 5 by replacement of steps S115 and S120 with steps S116 and S121 and replacement of step S145 with step S145a. Otherwise the vehicle location specifying process of the second embodiment is similar to the vehicle location specifying process of the first embodiment. The like steps are shown by the like step numbers and are not specifically described.

As shown in FIG. 10, after the estimated location information is obtained at step S110, the area estimator 113 specifies a nearest point (step S116). The area estimator 113 subsequently refers to the vector table stored in the fourth vector information storage unit 144 to identify a fourth vector Vcs related to the nearest point specified at step S116 (step S121). The fourth vector Vcs related to the specific point nearest to the location estimated as the current location of the vehicle is approximate to a vector directed from the imaging camera 200 to the object feature at the current location of the vehicle.

After the processing of step S121, the CPU 110 performs the processing of steps S125 to S140 described above. After the processing of step S140, the locator 114 compares the fifth vector Vgs calculated at step S140 with the fourth vectors Vcs in relation to the respective specific points to identify the fourth vector Vcs most approximate to the fifth vector Vgs, and then identifies a specific point related to the identified fourth vector Vcs (step S145a). The procedure subsequently performs the processing of step S150 described above.

The location specifying apparatus 100a of the second embodiment described above has the similar advantageous effects to those of the location specifying apparatus 100 of the first embodiment. Additionally, the location specifying apparatus 100a of the second embodiment identifies the fourth vector Vcs related to the specific point nearest to the location estimated as the current location of the vehicle and estimates the existing area based on the fourth vector Vcs. The fourth vector Vcs related to the specific point nearest to the location estimated as the current location of the vehicle is approximate to the vector directed from the imaging camera 200 to the object feature at the current location of the vehicle. This ensures estimation of the existing area with high accuracy. The location specifying apparatus 100a of the second embodiment registers the fourth vectors Vcs in advance in the vector table and selects and identifies the fourth vector Vcs by referring to this table. This reduces the processing load required for identifying the fourth vector Vcs. Accordingly, this further shortens the time required for specifying the location of the vehicle.

The fourth vector Vcs of the second embodiment corresponds to the first vector in the claims.

C. Third Embodiment

Figure 11:
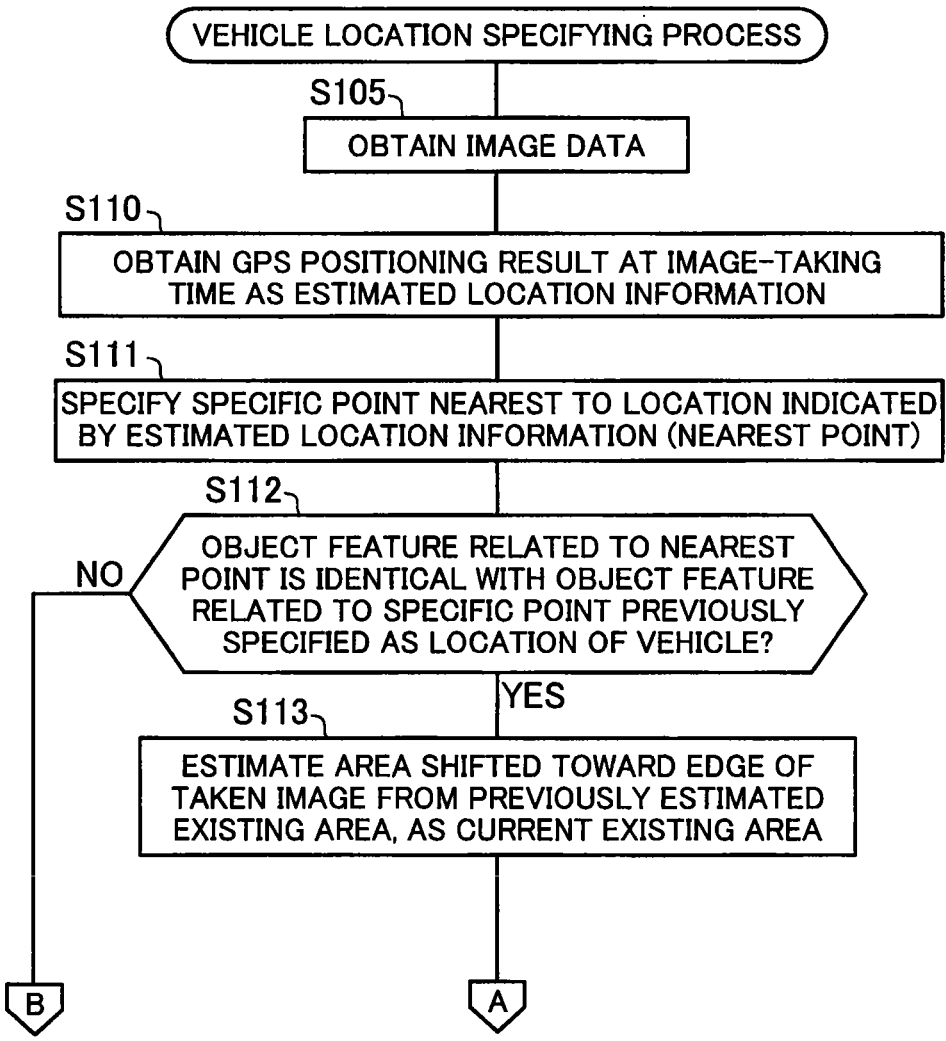
FIG. 11 is a flowchart showing a procedure of vehicle location specifying process according to a third embodiment.
Figure 12:
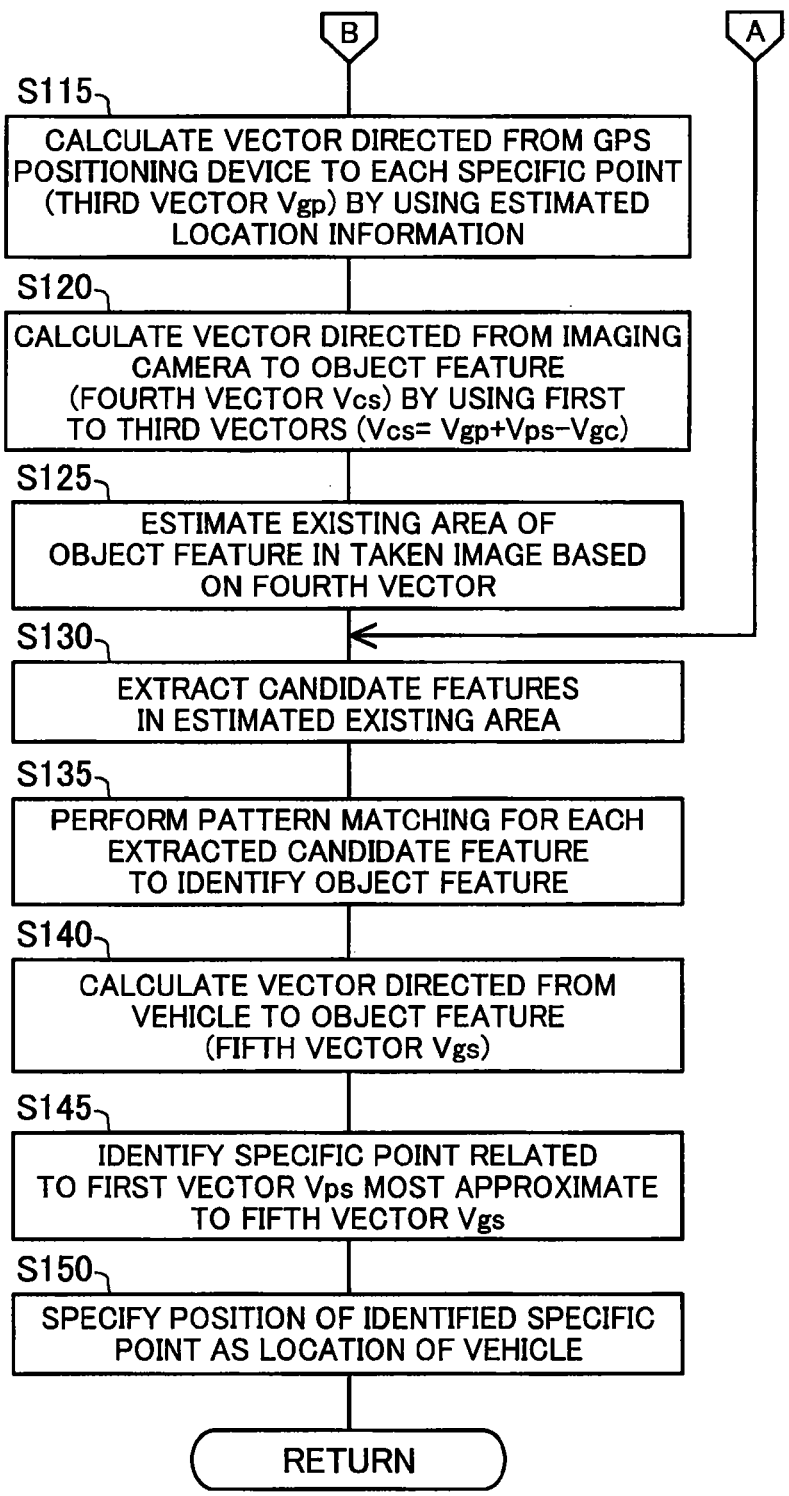
FIG. 12 is a flowchart showing a procedure of vehicle location specifying process according to a third embodiment.

FIGS. 11 and 12 are flowchart showing a procedure of vehicle location specifying process according to a third embodiment. A location specifying apparatus of the third embodiment has a configuration similar to the configuration of the location specifying apparatus 100 of the first embodiment shown in FIG. 1. The like components are expressed by the like symbols and are not specifically described. The vehicle location specifying process of the third embodiment differs from the vehicle location specifying process of the first embodiment shown in FIG. 5 by addition of steps S111, S112 and S113. Otherwise the vehicle location specifying process of the third embodiment is similar to the vehicle location specifying process of the first embodiment. The like steps are shown by the like step numbers and are not specifically described.

The vehicle location specifying process of the third embodiment moves (shifts) an area estimated as the existing area in the image under a predefined condition. The following describes its concrete process with reference to FIGS. 11 and 12.

As shown in FIG. 11, after the estimated location information is obtained at step S110, the area estimator 113 specifies a nearest point (step S111). This step S111 is identical with step S116 of the second embodiment described above.

The area estimator 113 subsequently refers to the vector table to identify an object feature related to the nearest point specified at step S111 and determines whether this identified object feature is identical with an object feature related to a specific point previously specified as the location of the vehicle (step S112).

When it is determined that the object feature related to the nearest point is identical with the object feature related to the specific point previously specified as the location of the vehicle (step S112: YES), the area estimator 113 estimates an area shifted toward the edge of the taken image from the previously estimated existing area, as a current existing area (step S113). When the previously estimated existing area is located in the left half area of the taken image, the area estimator 113 estimates an area shifted by a predetermined amount toward the left edge of the taken image, as a current existing area. When the previously estimated existing area is located in the right half area of the taken image, on the other hand, the area estimator 113 estimates an area shifted by a predetermined amount toward the right edge of the taken image, as a current existing area.

Figure 13A:
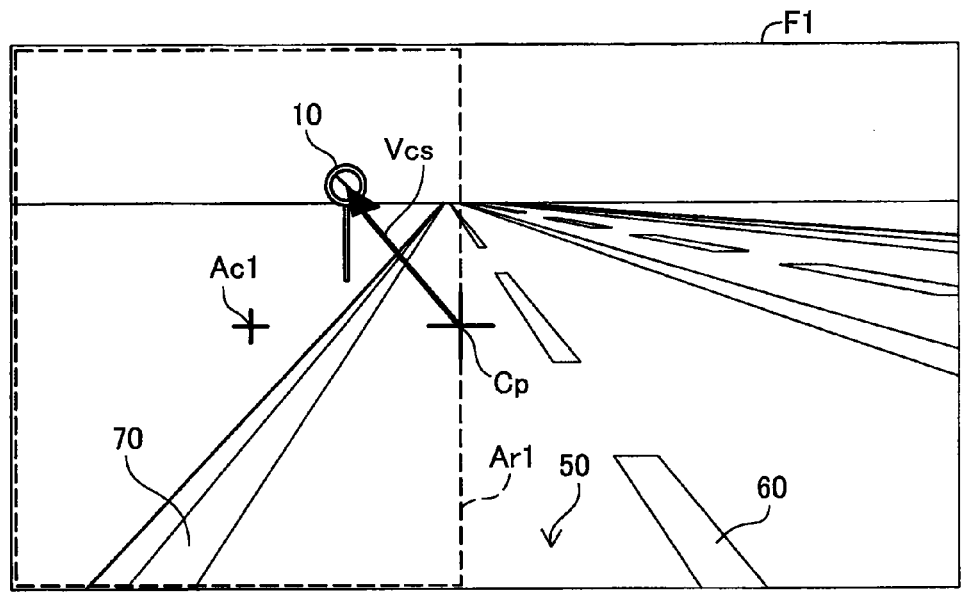
FIG. 13A shows an image F1 obtained in a previous cycle of the vehicle location specifying process.
Figure 13B:
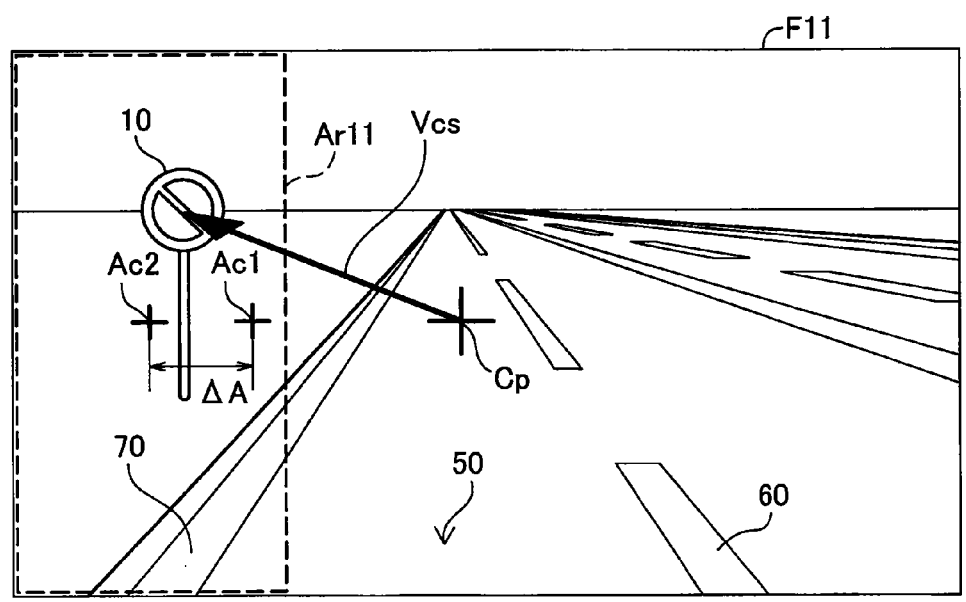
FIG. 13B shows an image F11 obtained in a current cycle of the vehicle location specifying process.

FIGS. 13A and 13B are diagrams illustrating one example of the processing of step S113. FIG. 13A shows an image F1 obtained in a previous cycle of the vehicle location specifying process, and FIG. 13B shows an image F11 obtained in a current cycle of the vehicle location specifying process. The image F1 of FIG. 13A is similar to the image F1 of FIG. 7, with addition of a center point Ac1 of an existing area Ar1 in FIG. 13A. FIG. 13B shows a fourth vector Vcs in the image F11, like FIG. 13A.

As shown in FIG. 13A, in the previous cycle of the vehicle location specifying process, a left half area Ar1 of the image F1 is identified as the existing area. At step S113 in the current cycle of the vehicle location specifying process, as shown in FIG. 13B, an area Ar11 shifted toward the left edge in the image F11 is specified as a new existing area. In this embodiment, "shifting toward the left edge" means shifting a center point of an area toward the left edge. More specifically, a center point Ac2 of the existing area Ar11 shown in FIG. 13B is shifted by AA toward the left edge from the center point Ac1 of the existing area Ar1 shown in FIG. 13A. The position of the shifted center point has no change in the vertical direction in the existing area. According to this embodiment, the left edge of the existing area is identical with the left edge of the image. Accordingly, the left edge of the existing area does not shift accompanied with a leftward shift of the center point of the existing area. The existing area Ar11 shown in FIG. 13B is accordingly smaller than the existing area Ar1 shown in FIG. 13A.

As shown in FIG. 13, the sign 10 placed on the left side of the lane 50 shifts leftward in the view from the imaging camera 200 with the move of the vehicle. Accordingly, the location of the sign 10 in the taken image is moved leftward in an image obtained at the later time. In the case of extraction of the same object feature, the area shifted toward the edge in the image obtained at the later time is thus estimated as the existing area. According to this embodiment, the shift amount AA of the existing area is stored in advance as a predefined amount according to the vehicle speed in the ROM 130. For example, the shift amount AA may be set to increase with an increase in current vehicle speed.

As shown in FIG. 12, after the processing of step S113 described above, the processing of and after step S130 is then executed as described above.

When it is determined at step S112 that the object feature related to the nearest point is not identical with the object feature related to the specific point previously specified as the location of the vehicle (step S112: NO), as shown in FIG. 12, the procedure performs the processing of and after step S115 as described above. In this case, the area estimator 113 calculates the third vectors Vgp and the fourth vector Vcs and estimates the existing area based on the fourth vector Vcs. When the object feature related to the nearest point is not identical with the object feature related to the specific point previously specified as the location of the vehicle, the object feature in the current cycle of the vehicle location specifying process is more likely to be different from the previous object feature. Accordingly, it is not reasonable to estimate the area shifted toward the edge in the image obtained at the later time as the new existing area as described above. For this reason, like the first embodiment, the area estimator 113 newly calculates the fourth vector Vcs and estimates the new existing area based on the fourth vector Vcs.

The location specifying apparatus of the third embodiment described above has the similar advantageous effects to those of the location specifying apparatus 100 of the first embodiment. Additionally, when the object feature identified in the current cycle of the vehicle location specifying process is expected to be the same as the previously identified object feature, the location specifying apparatus of the third embodiment estimates the area shifted toward the edge of the image from the previously identified area, as the new existing area. This ensures estimation of the existing area with the higher accuracy. Shifting the area toward the edge of the image narrows the estimated existing area. This further reduces the processing load of the CPU 110 in the process of extracting candidate features. Accordingly, this further shortens the time required for specifying the location of the vehicle.

D. Fourth Embodiment

FIG. 14 is a diagram showing one example of settings in a vector table according to a fourth embodiment. A location specifying apparatus of the fourth embodiment differs from the location specifying apparatus 100 of the first embodiment by the settings in the vector table. Otherwise the configuration of the location specifying apparatus of the fourth embodiment is similar to the configuration of the location specifying apparatus 100 of the first embodiment. The like components are expressed by the like symbols and are not specifically described.

As shown in FIG. 14, the vector table of the fourth embodiment differs from the vector table of the first embodiment shown in FIG. 3 by addition of an "angle" field. Otherwise the configuration (fields) of the vector table of the fourth embodiment is similar to the configuration of the vector table of the first embodiment and is thus not specifically described. The vector table of FIG. 14 has registry of four records with respect to four specific points p5, p6, p7 and p8 which are different from the specific points p1 to p3 described above. According to this embodiment, the angle field stores angles between first vectors and a normal line of a representative surface of an object feature.

Figure 15:
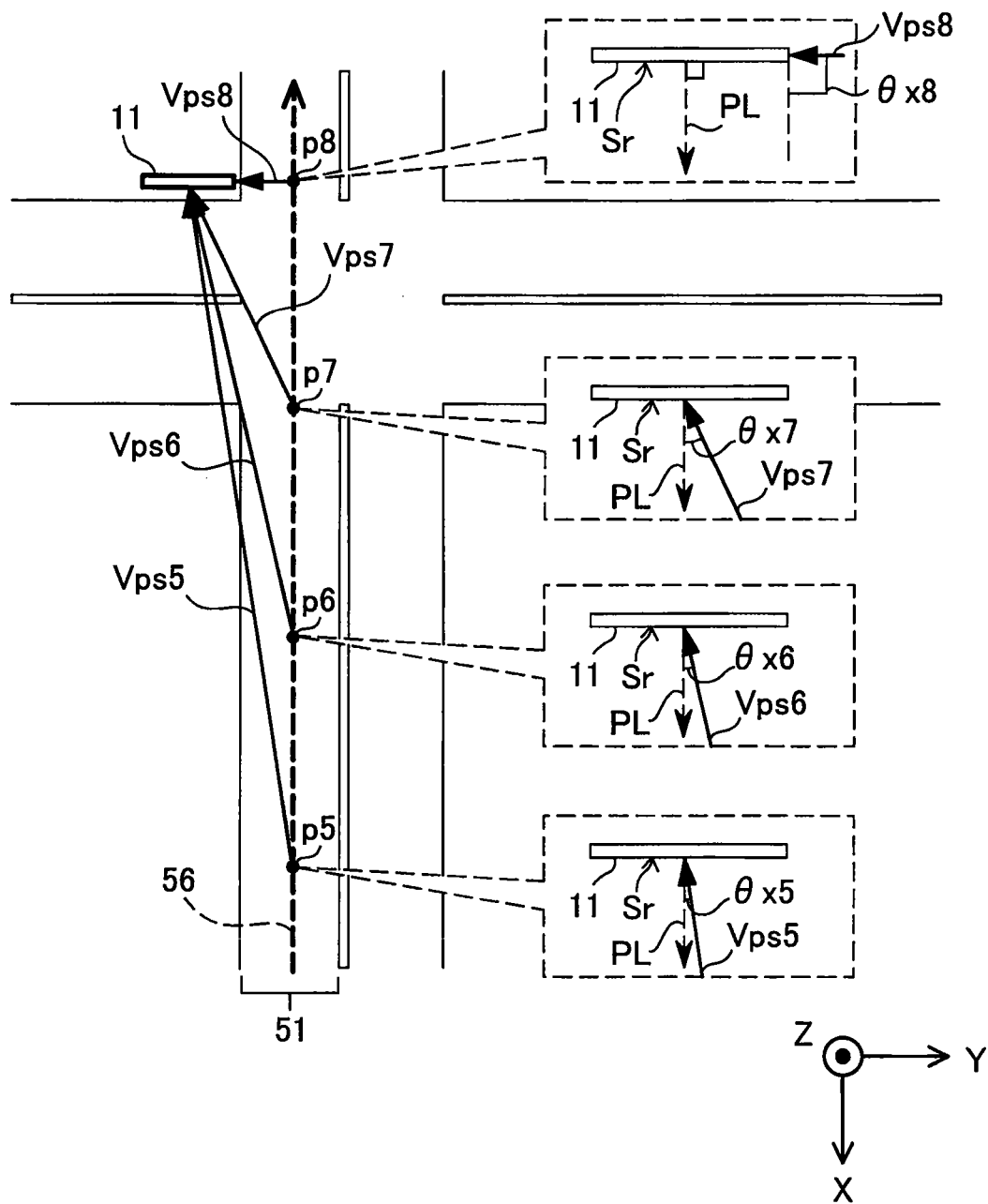
FIG. 15 is a diagram illustrating one example of settings in the angle field of the vector table.

FIG. 15 is a diagram illustrating one example of settings in the angle field of the vector table. In the example of FIG. 15, four specific points p5 to p8 are set on a middle line 56 of a lane 51. A sign 11 is set as the object feature related to these four specific points p5 to p8. An object feature identifier "L11" shown in FIG. 14 is the identifier of the sign 11. As shown in FIG. 15, first vectors Vps5 to Vps8 are respectively set in relation to four specific points p5 to p8.

As shown in broken-line bubbles of FIG. 15, angles between a normal vector PL of a representative surface Sr of the sign 11 and the first vectors Vps5 to Vps8 (hereinafter called "object feature angles") are set in relation to the respective specific points p5 to p8. According to this embodiment, the "angle between the normal vector PL and the first vector Vps" denotes the smaller angle between two angles obtained by projecting these two vectors PL and Vps on three planes, i.e., X-Y plane, X-Z plane and Y-Z plane and determining angles between two projection vectors on each plane. According to this embodiment, the X-Y plane denotes a horizontal plane at the installation position of the sign 11. The X-Z plane denotes a plane perpendicular to the X-Y plane and parallel to the middle line 56. The Y-Z plane denotes a plane perpendicular to the X-Y plane and orthogonal to the middle line 56. FIG. 15 shows the angles between the projection vectors on the X-Y plane as the representative of the angles between the normal vector PL and the first vectors Vps associated with the respective specific points p5 to p8.

As shown in FIGS. 14 and 15, an angle θ×5 between the normal vector PL and the first vector Vps5 is set as part of the object feature angles with respect to the specific point p5. Similarly, an angle θ×6 between the normal vector PL and the first vector Vps6 is set as part of the object feature angles with respect to the specific point p6. An angle θ×7 between the normal vector PL and the first vector Vps7 is set as part of the object feature angles with respect to the specific point p7. An angle θ×8 between the normal vector PL and the first vector Vps8 is set as part of the object feature angles with respect to the specific point p8.

As shown in FIG. 15, with respect to the object feature angles, the angle between the projection vectors on the X-Y plane is set to the larger value at the specific point nearer to the sign 11. In the example of FIG. 15, the specific point p8 is located lateral to the sign 11 along the middle line 56 and has the object feature angle of 90 degrees. Different specific points have different object feature angles in this manner and thereby have different external shapes of the representative surface of the object feature in the taken image.

Figure 16:
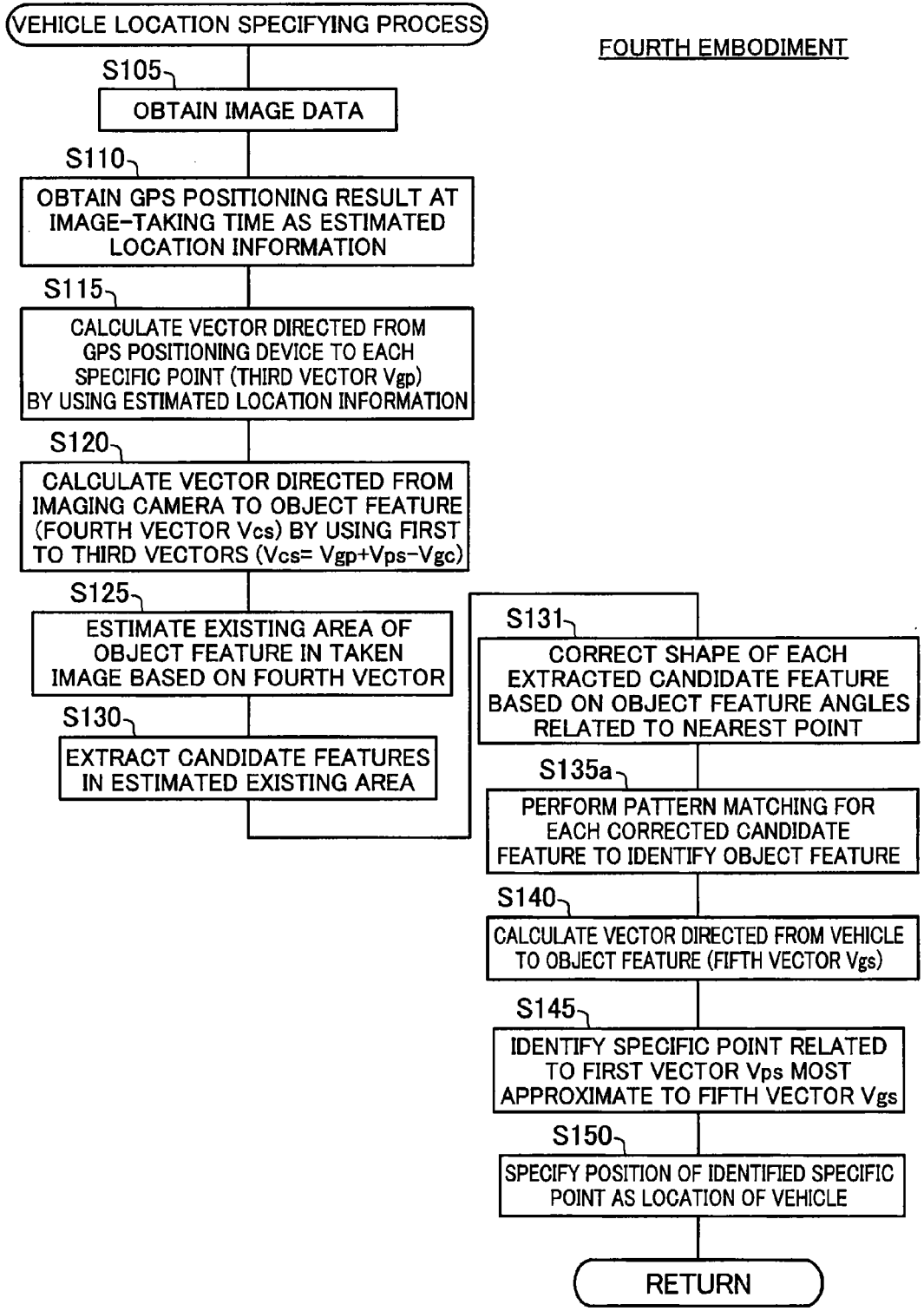
FIG. 16 is a flowchart showing a procedure of vehicle location specifying process according to the fourth embodiment.

FIG. 16 is a flowchart showing a procedure of vehicle location specifying process according to the fourth embodiment. The vehicle location specifying process of the fourth embodiment differs from the vehicle location specifying process of the first embodiment shown in FIG. 5 by addition of step S131 and replacement of step S135 with step S135a. Otherwise the vehicle location specifying process of the fourth embodiment is similar to the vehicle location specifying process of the first embodiment. The like steps are shown by the like step numbers and are not specifically described.

After extraction of candidate features at step S130, the locator 114 corrects the shape of each of the extracted candidate features based on the object feature angles related to a nearest point (step S131). More specifically, the locator 114 specifies a nearest point and refers to the vector table to identify the object feature angles related to the nearest point. The locator 114 subsequently performs image processing using the identified object feature angles such that a representative surface of each candidate feature faces the front in the image (such as to make the normal vector PL of the sign 11 parallel to the first vector Vps) and thereby corrects (deforms) the shape of the candidate feature. Any of known techniques may be employed for such image processing.

The locator 114 performs pattern matching for each of the corrected candidate features with object features related to the respective specific points, so as to identify the object feature included in the taken image (step S135a). After the processing of step S135a, the processing of steps S140 to S150 is then executed as described above.

The location specifying apparatus of the fourth embodiment described above has the similar advantageous effects to those of the location specifying apparatus 100 of the first embodiment. Additionally, the location specifying apparatus of the fourth embodiment sets in advance object feature angles in relation to the respective specific points and corrects (deforms) the shape of each candidate feature based on the object feature angles related to the nearest point. Irrespective of the location of the vehicle on the middle line 56 of the lane 51 relative to the object feature, this enables the object feature to be identified with high accuracy by pattern matching for the candidate features.

E. Fifth Embodiment

E1. Configuration of Apparatus

Figure 17:
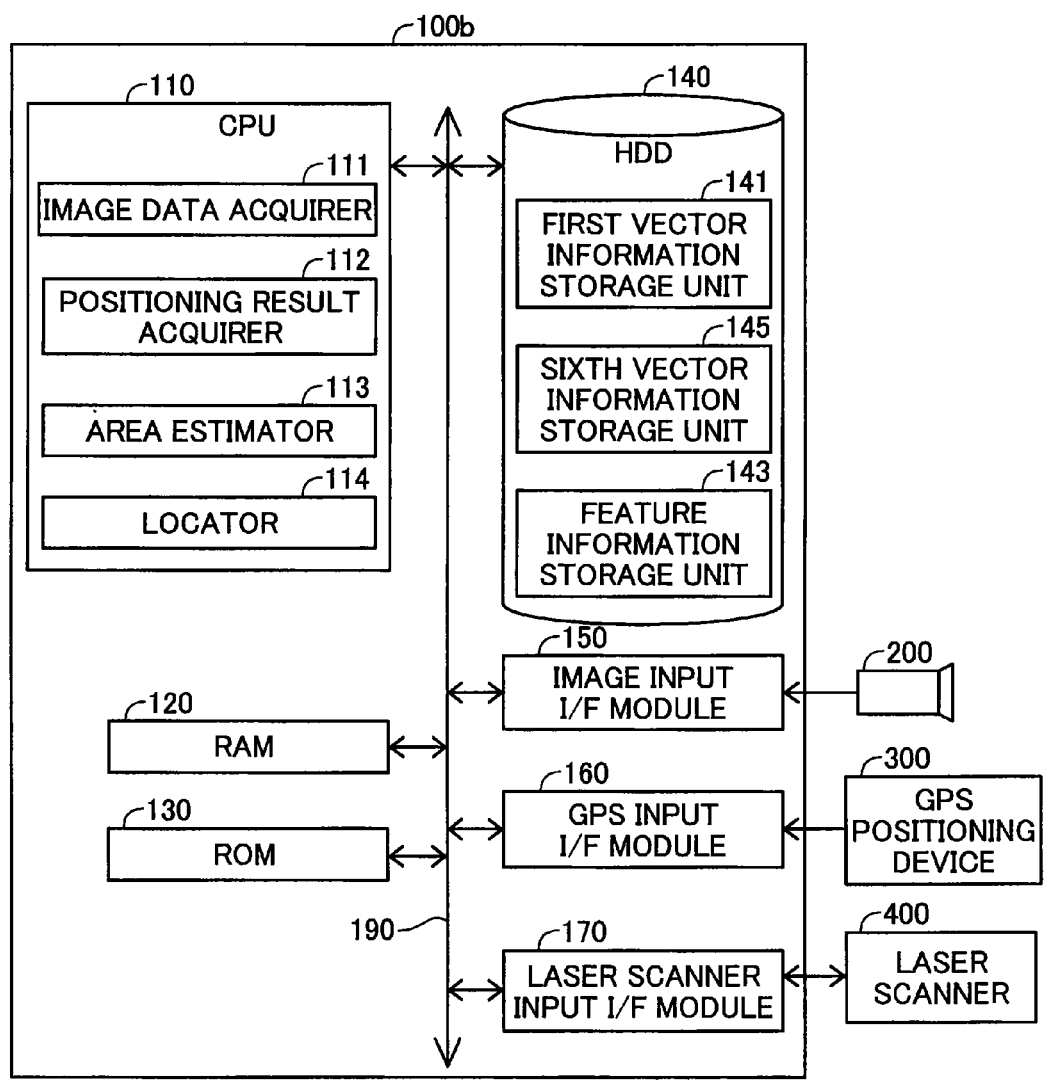
FIG. 17 is a block diagram illustrating the schematic configuration of a location specifying apparatus 100b according to a fifth embodiment.

FIG. 17 is a block diagram illustrating the schematic configuration of a location specifying apparatus 100b according to a fifth embodiment. The location specifying apparatus 100b of the fifth embodiment differs from the location specifying apparatus 100 of the first embodiment shown in FIG. 1 by that a laser scanner input interface (I/F) module 170 is additionally provided and that the hard disk drive 140 includes a sixth vector information storage unit 145 in place of the second vector information storage unit 142. Otherwise the configuration of the location specifying apparatus 100b of the fifth embodiment is similar to the configuration of the location specifying apparatus 100 of the first embodiment. The like components are expressed by the like symbols and are not specifically described.

The laser scanner input interface module 170 has an interface for connection with a laser scanner 400 and is connected with the laser scanner 400. The laser scanner input interface module 170 is also connected with the internal bus 190 and sends the measurement result by the laser scanner 400 to the CPU 110 via the internal bus 190. The laser scanner 400 emits a laser pulse and receives its reflected wave to measure a distance, a horizontal angle and a vertical angle of an object relative to the position of the laser scanner 400.

Figure 18:
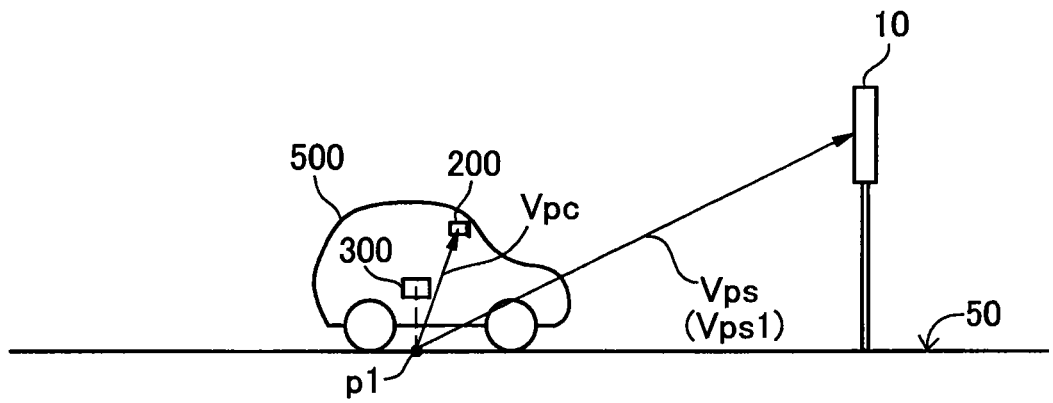
FIG. 18 is a diagram illustrating a sixth vector in the fifth embodiment.

FIG. 18 is a diagram illustrating a sixth vector in the fifth embodiment. The sixth vector is stored in advance in the sixth vector information storage unit 145 shown in FIG. 17. As shown in FIG. 18, a sixth vector Vpc denotes a vector directed from a specific point to the imaging camera 200 when the GPS positioning device 300 is located vertically above the specific point. FIG. 18 shows the sixth vector Vpc when the GPS positioning device 300 is located vertically above a specific point p1. This sixth vector Vpc is, however, a fixed vector irrespective of the location of the vehicle. More specifically, when the GPS measuring device 300 is located vertically above another specific point, a vector directed from this another specific point to the imaging camera 200 is identical with the sixth vector Vpc shown in FIG. 18. When the GPS measuring device 300 is located vertically above any position other than any specific point, a vector directed from this position to the imaging camera 200 is identical with the sixth vector Vpc shown in FIG. 18. This sixth vector Vpc may be determined in advance by measurement.

E2. Vehicle Location Specifying Process

Figure 19:
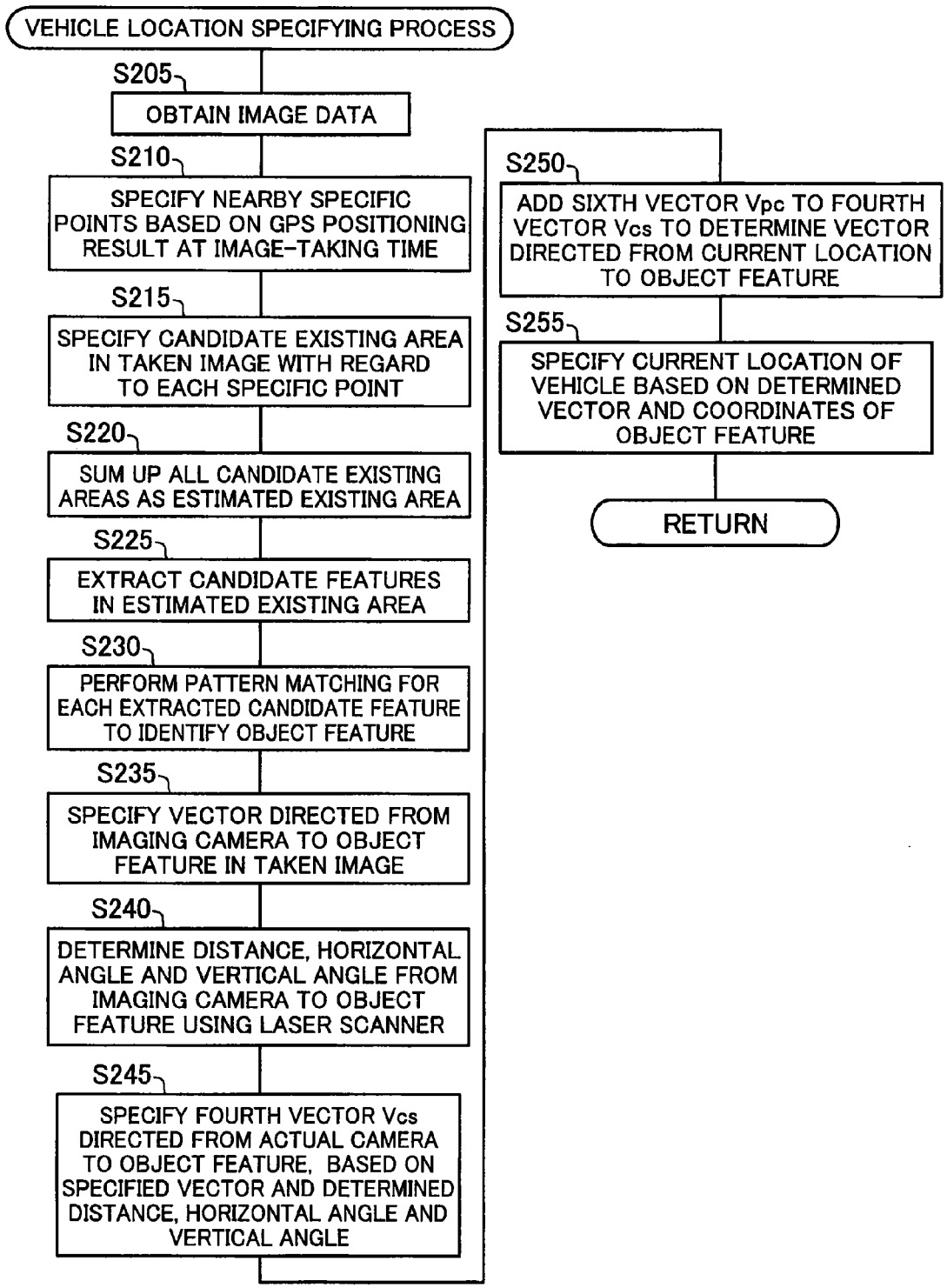
FIG. 19 is a flowchart showing a procedure of vehicle location specifying process according to the fifth embodiment.

FIG. 19 is a flowchart showing a procedure of vehicle location specifying process according to the fifth embodiment. After the power-on, the vehicle location specifying process is performed repeatedly in the location specifying apparatus 100b. The image data acquirer 111 first obtains image data (step S205). This step S205 is similar to step S105 in the above embodiments and is not specifically described.

The area estimator 113 specifies nearby specific points around the estimated current location of the vehicle, based on the positioning result by the GPS positioning device 300 at the image-taking time (step S210). The GPS positioning device 300 receives signals from a plurality of GPS satellites and respectively specifies a plurality of areas estimated to include the current location, based on the respective signals. The area estimator 113 specifies specific points included in an overlap area of the plurality of specified areas, as the nearby specific points around the estimated current location at step S210. The method of specifying the nearby specific points around the estimated current location is not limited to this procedure, but another procedure as described below may be employed for the same purpose. The area estimator 113 may specify specific points included in a predetermined area (for example, a circular area with a predetermined radius) about the location determined by the positioning result of the GPS positioning device 300, as the nearby specific points around the estimated current location. In the description below, it is assumed that the above three specific points p1, p2 and p3 shown in FIG. 2 are specified at step S210.

With regard to each of the nearby specific points specified at step S210, the area estimator 113 identifies the end point of a first vector Vps in the taken image on the assumption that the first vector Vps is included in the taken image and specifies a predetermined area about the position of the identified end point as an area that is a possible candidate for the existing area (hereinafter referred to as "candidate existing area") (step S215). According to this embodiment, the area estimator 113 specifies a square area with a predetermined number of pixels on each side about the position of the end point of the first vector Vps in the image, as the candidate existing area. The length of each side of this candidate existing area is set according to the distance between the specific point and the object feature (magnitude of the first vector Vps). More specifically, the length of each side of the candidate existing area is set to the larger value in relation to the specific point having the smaller distance from the object feature. The size of an identical object feature in the taken image decreases with an increase in distance of the vehicle from the object feature. The above configuration accordingly enables an area of adequate size to be specified with elapse of time, as the candidate existing area. After the processing of step S215, the area estimator 113 sums up all the candidate existing areas with regard to the respective specific points obtained at step S215, as an existing area (step S220).

Figure 20:
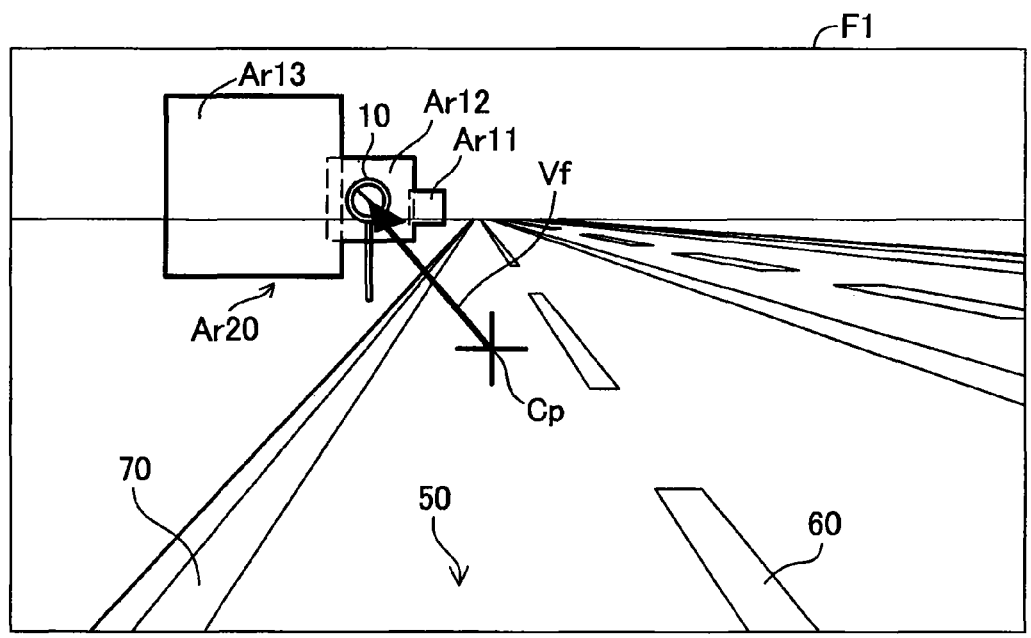
FIG. 20 is a diagram illustrating an existing area according to the fifth embodiment.

FIG. 20 is a diagram illustrating an existing area according to the fifth embodiment. An image F1 of FIG. 20 differs from the image F1 of FIG. 7 by replacement of the existing area Ar1 with an existing area Ar20 but is otherwise similar to the image F1 of FIG. 7.

In FIG. 20, the existing area Ar20 is shown as an area encompassed by the thick solid line. This existing area Ar20 is a total area of a candidate existing area Ar11, a candidate existing area Ar12 and a candidate existing area Ar13. The candidate existing area Ar11 denotes a candidate existing area with regard to the specific point p1. More specifically, the candidate existing area Ar11 denotes an estimated area where the object feature (sign 10) is expected to exist in the taken image when the current location of the vehicle is at the specific point p1. Similarly, the candidate existing area Ar12 denotes a candidate existing area with regard to the specific point p2, and the candidate existing area Ar13 denotes a candidate existing area with regard to the specific point p3. Among the three specific points p1, p2 and p3, the specific point p1 is most distant from the sign 10 as the object feature, the specific point p2 is second most distant from the sign 10, and the specific point p3 is nearest to the sign 10. Accordingly, the candidate existing area Ar11 is the smallest, the candidate existing area Ar12 is the second smallest and the candidate existing area Ar13 is the largest as shown in FIG. 20.

Referring back to FIG. 19, after the processing of step S220, the locator 114 performs the processing of steps S225 and S230. These two steps are respectively similar to steps S130 and S135 in the above embodiments and are thus not specifically described.

After identification of an object feature at step S230, the locator 114 specifies a vector directed from the imaging camera 200 to the identified object feature in the taken image (step S235). In the example of FIG. 20, a vector Vf directed from the center Cp of the image F1 to the center point of the object feature is specified at step S235, as the vector directed from the imaging camera 200 to the object feature in the taken image.

The locator 114 controls the laser scanner 400 via the laser scanner input interface module 170 to determine the distance, the horizontal angle and the vertical angle from the laser scanner 400 to the object feature. According to this embodiment, the laser scanner 400 is placed in the vicinity of the imaging camera 200. Accordingly, the distance, the horizontal angle and the vertical angle from the laser scanner 400 to the object feature can be regarded as the distance, the horizontal angle and the vertical angle from the imaging camera 200 to the object feature. Accordingly, the locator 114 determines the distance, the horizontal angle and the vertical angle from the imaging camera 200 to the object feature (step S240).

The locator 114 subsequently specifies a vector directed from the actual imaging camera 200 (not in the image F1) to the object feature (fourth vector Vcs), based on the vector specified at step S235 (for example, vector Vf) and the distance, the horizontal angle and the vertical angle determined at step S240 (step S245). The locator 114 reads out the sixth vector Vpc stored in the sixth vector information storage unit 145 and adds the sixth vector Vpc to the fourth vector Vcs specified at step S245, so as to determine a vector directed from the current location to the object feature (step S250). The locator 114 then specifies the current location of the vehicle, based on the vector obtained at step S250 and the coordinates of the object feature (step S255).

Figure 21:
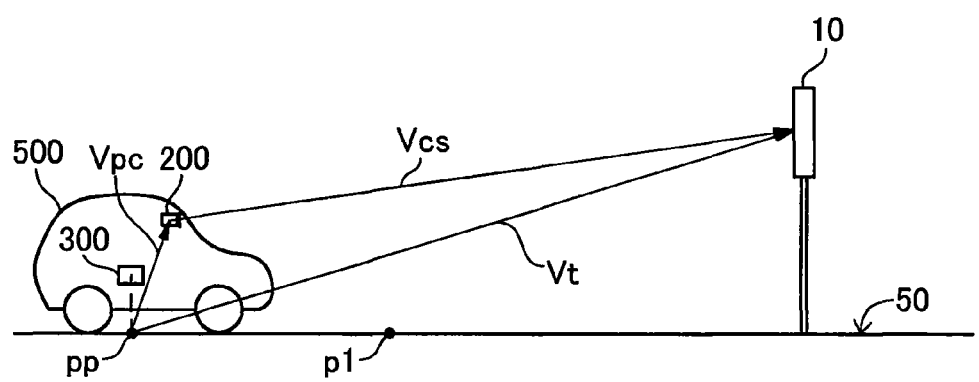
FIG. 21 is a diagram schematically illustrating the processing detail of steps S250 and S255.

FIG. 21 is a diagram schematically illustrating the processing detail of steps S250 and S255. As described above, the fourth vector Vcs shown in FIG. 21 is specified at step S245. A vector directed from a current location pp of the vehicle to the sign 10 as the object feature (vector Vt) is accordingly determined by adding the sixth vector Vpc to this fourth vector Vcs. The coordinates of the current location pp are then specified, based on this vector Vt and the known coordinates of the sign 10.

The location specifying apparatus 100*b* of the fifth embodiment described above has the similar advantageous effects to those of the location specifying apparatus 100 of the first embodiment. As clearly understood from the above respective embodiments, it is not essential to store the second vector Vgc in advance in the location specifying apparatus. Like this embodiment, a vector Vpc directed from a certain point (point vertically below the GPS positioning device 300) to the imaging camera 200 may alternatively be stored in advance.

E3. Modification of Fifth Embodiment

The procedure of the vehicle location specifying process of the fifth embodiment may be modified as described below. After the processing of steps S205 to S230, the CPU 110 may identify the candidate existing area in which the identified object feature (more specifically, center point of the object feature) is located in the taken image. The CPU 110 may subsequently specify the position of the specific point related to the identified candidate existing area in which the object feature is located, as the current location of the vehicle. In the example of FIG. 20, the sign 10 is located in the candidate existing area Ar12, so that the position of the specific point p2 is specified as the current location of the vehicle. The candidate existing area is set as an area in which the object feature is possibly included in the taken image when the vehicle is located at the specific point related to the candidate existing area. The presence of the object feature in a certain candidate existing area accordingly shows that the vehicle is located at or closest to the specific point related to the candidate existing area. The configuration of this modification accordingly enables the current location of the vehicle to be specified with high accuracy. Additionally, this configuration simplifies the processing and reduces the overall processing load of the vehicle location specifying process, thus shortening the time required for specifying the current location of the vehicle.

F. Modifications

F1. Modification 1

In the above embodiments other than the second and the fifth embodiments, the vehicle location specifying process identifies the first vector Vps most approximate to the fifth vector Vgs at step S145. The disclosure is, however, not limited to this configuration. For example, in a modified procedure the CPU 110 may calculate a vector (Vgs−Vgp) with regard to each specific point by subtracting the third vector Vgp from the fifth vector Vgs, compare the first vector Vps associated with the specific point with this calculated vector and identify a specific point having the smallest difference between these two vectors. The vector (Vgs−Vgp) obtained by subtracting the third vector Vgp from the fifth vector Vgs is more approximate to the first vector Vps. Identifying a specific point related to the first vector Vps most approximate to this obtained vector accordingly leads to identifying the specific point closest to the actual location of the vehicle and thereby enables the location of the vehicle to be specified with higher accuracy.

Similarly, in the second embodiment, the vehicle location specifying apparatus 100a identifies the fourth vector Vcs most approximate to the fifth vector Vgs at step S145a. The disclosure is, however, not limited to this configuration. For example, in a modified procedure the CPU 110 may calculate a vector (Vgs−Vgc) with regard to each specific point by subtracting the second vector Vgc from the fifth vector Vgs, compare the fourth vector Vcs associated with the specific point with this calculated vector and identify a specific point having the smallest difference between these two vectors. The vector (Vgs−Vgc) obtained by subtracting the second vector Vgc from the fifth vector Vgs is more approximate to the fourth vector Vcs. Identifying a specific point related to the fourth vector Vcs most approximate to this obtained vector accordingly leads to identifying the specific point closest to the actual location of the vehicle and thereby enables the location of the vehicle to be specified with higher accuracy.

F2. Modification 2

In the above embodiments other than the second and the fifth embodiments, the position of the specific point identified at step S145 is specified as the location of the vehicle. In the second embodiment, the position of the specific point identified at step S145a is specified as the location of the vehicle. The disclosure is, however, not limited to these configurations. As the vehicle moves during the time period of obtaining image data at step S105 and specifying the location of the vehicle at step S150, the location of the vehicle specified at step S150 is deviated from the actual location of the vehicle when step S150 is actually performed. In a modified procedure the CPU 110 may accordingly measure the time required from the start of step S105 to the end of step S150, estimate a moving distance of the vehicle from the start of step S105 to the end of step S150 based on the calculated time and the vehicle speed, correct the position of the specific point identified at step S145 or S145a in the moving direction of the vehicle based on the estimated moving distance, and specify this corrected position as the location of the vehicle. This modification enables the current location of the vehicle to be specified with higher accuracy.

F3. Modification 3

In the above embodiments other than the third and the fifth embodiments, the existing area is estimated as either a right half area or a left half area of an image. The disclosure is, however, not limited to this configuration. For example, the existing area may be estimated as one of four divisional areas, upper left, lower left, upper right and lower right areas of an image. With reference to the example of FIG. 7, In a modified procedure the area estimator 113 may determine a projection vector of the fourth vector Vcs on the plane perpendicular to the middle line 55, identify whether the projection vector is a vector directed rightward or a vector directed leftward as well as whether the projection vector is a vector directed upward or a vector directed downward, and estimate one of the four areas as the existing area.

The shape of the existing area is not limited to the rectangular shape but may be any shape such as circular shape or triangular shape. When the object feature is not a road surface marking but is a feature placed outside of the road such as a sign or a power pole, the existing area may be estimated after exclusion of an area distinctly estimated as the road from the taken image. In a procedure employed for specifying the area estimated as the road the area estimator 113 may detect a road marking line and a curbstone by, for example, pattern matching and specify an area (lane) defined by such detection result as the area as the road.

F4. Modification 4

In the second embodiment, the fourth vector Vcs set in the vector table is the vector directed from the imaging camera 200 to the object feature when the vehicle (GPS positioning device 300) is located vertically above each specific point. The disclosure is, however, not limited to this configuration. For example, a vector directed from the imaging camera 200 to the object feature when the vehicle (GPS positioning device 300) is located at a point offset by a predetermined distance along the moving direction of the vehicle or its opposite direction from the position vertically above each specific point may be set as the fourth vector Vcs in the vector table.

F5. Modification 5

In the above embodiments, the specific points are set on the middle line 55 or on the middle line 56. The specific points may alternatively be set at any positions along the lane 50 or the lane 51, instead of the middle line 55 or 56. The specific points are set at predetermined intervals along the middle line 55 or 56 in the above embodiments but may be set at various intervals.

F6. Modification 6

In the above embodiments, only one type of the second vector Vgc is stored in advance in the hard disk drive 140. Instead of only one type, any number of different types of vectors may be stored as the second vectors Vgc. For example, in an application of the location specifying apparatus 100 to a plurality of different types of vehicles, the different types of vehicles may have different installation positions of the GPS positioning device 300 and different installation positions of the imaging camera 200. The second vectors Vgc for the respective types of vehicles may thus be stored in the hard disk drive 140. In a modified procedure the CPU 110 may identify the type of the vehicle prior to or during the vehicle location specifying process and use the second vector Vgc corresponding to the identified type of the vehicle. In this modified configuration the CPU 110 uses the vector reflecting the actual locations of the GPS positioning device 300 and the imaging camera 200 in the vehicle, as the second vector Vgc. This accordingly enables the location of the vehicle to be specified with higher accuracy.

F7. Modification 7

In the above embodiments, the start point and the end point of each of the first to the fourth vectors may be exchanged with each other. For example, in the first embodiment, vectors directed from an object feature as the start point to respective specific points as the end point may be employed as the first vectors Vps. In the second embodiment, vectors directed from an object feature as the start point to the position of the imaging camera 200 as the end point when the vehicle (GPS positioning device 300) is located vertically above the respective specific points may be employed as the fourth vectors Vcs.

F8. Modification 8

In the fourth embodiment, the candidate features are subjected to correction of the shape based on the object feature angles at step S131 in FIG. 16. In place of or in addition to the candidate features, the shapes of polygons of object features related to the respective specific points may be subjected to correction.

F9. Modification 9

In the above embodiments, the angles associated with each specific point (object feature angles) are the angles between the normal vector PL and the first vector Vps. These angles may be replaced with angles between the representative surface Sr of the object feature and the first vector Vps. These angles may be specified as follows. The locator 114 may project the representative surface Sr and the first vector Vps on the X-Y plane, the X-Z plane and the Y-Z plane and specify the smallest angle among the angles between the projection of the representative surface Sr and the projection of the first vector Vps on each plane, as the angle between the representative surface Sr and the first vector Vps. In general, any angle associated with an angle between a representative surface of a predetermined feature and a first vector may be employed as the relevant angle in the location specifying apparatus of the disclosure.

F10. Modification 10

The configurations of the location specifying apparatuses 100 and 100a of the above embodiments are only illustrative and may be modified in various ways. For example, the first vector information storage unit 141, the second vector information storage unit 142 and the feature information storage unit 143 are all stored in the hard disk drive 140 in the above embodiments but may be stored in the ROM 130 instead of the hard disk drive 140. In the above embodiments, the imaging camera 200 and the GPS positioning device 300 are provided separately from the location specifying apparatus 100. At least one of the imaging camera 200 and the GPS positioning device 300 may, however, be provided integrally with the location specifying apparatus 100. The imaging camera 200 is installed to have the imaging range ahead of the vehicle in the above embodiments but may alternatively be installed to have the imaging range behind the vehicle. The object features described in the above embodiments are the signs 10 and 11 respectively located outside of the lane 50 and the outside of the lane 51. The object feature may, however, be a road surface marking. The GPS positioning device 300 may be replaced with a Galileo system being created by the EU. In the above embodiments, the image data used in the vehicle location specifying process is data obtained by the imaging camera 200. The disclosure is, however, not limited to this configuration. For example, the image data may be data defined by reflected waves of radio waves in millimeter waveband or laser emitted from the vehicle.

F11. Modification 11

In the above embodiments, part of the configuration implemented by the hardware may be replaced by software configuration, while part of the configuration implemented by the software may be replaced by hardware configuration. When part or all of the functions of the disclosure is implemented by the hardware, the hardware may be provided as various circuits including integrated circuits and discrete circuits or as various combinations of these circuits. When part or all of the functions of the disclosure is implemented by the software, the software (computer program) may be provided in the form of storage in a computer readable recording medium. In the description hereof, the "computer readable recording medium" is not limited to a portable recording medium such as a flexible disk or a CD-ROM but includes internal storage devices of the computer such as various RAMs and ROMs, as well as external storage devices fixed to the computer such as hard disk drives. In other words, the "computer readable recording medium" is used in the broad sense including various recording media that are capable of storing data in a non-transitory manner.

The above embodiments illustrate and describe on the assumption that the vehicle 500 keeps to the left side of the road. The disclosure is, however, not limited to this configuration, but the vehicle 500 may keep to the right side of the road. In other words, the vehicle 500 may keep to the left or keep to the right in conformity with the traffic regulations in each nation where the apparatus and the non-transitory computer readable recording medium of the disclosure are applied. In the above embodiments, the sign 10 is not limited to the sign shown in FIG. 7 and FIGS. 13A and 13B. The sign 10 may be any sign used in each nation where the apparatus and the non-transitory computer readable recording medium of the disclosure are applied. As described above, the non-essential descriptions in the above embodiments and modifications may be changed according to, for example, the traffic regulations and the culture of each nation.

The disclosure is not limited to the embodiments and the modifications described above but may be implemented by a diversity of other configurations without departing from the scope of the disclosure. For example, the technical features of any of the above embodiments and their modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential in the description hereof.

For example, according to one aspect of the disclosure, there is provided a location specifying apparatus that specifies a location of a moving body. This location specifying apparatus comprises a first vector information storage unit configured to store vector information regarding a first vector connecting a specific point-relevant location, which is associated with each of a plurality of specific points set along a road, with a location of a predetermined feature, related to position information regarding a position of the specific point; a predetermined feature location information storage unit configured to store predetermined feature location information regarding the location of the predetermined feature; an image data acquirer configured to obtain image data ahead of the moving body; and a locator configured to identify a location of the predetermined feature in an image shown by the image data and specify the location of the moving body based on the identified location of the predetermined feature and the vector information.

The location specifying apparatus of this aspect stores the vector information (information regarding the first vector connecting the specific point-relevant position with the location of the predetermined feature) related to the position information regarding the position of the specific point. The location specifying apparatus of this aspect uses this vector information to identify the location of the predetermined feature in the image and thereby makes only part of the area in the image subjected to processing. Compared with a configuration that makes the entire area of the image subjected to processing, this configuration reduces the processing load of the location specifying apparatus. Accordingly this aspect shortens the time required for specifying the location of the vehicle.

The location specifying apparatus of the above aspect may further comprise a location information acquirer configured to obtain estimated location information from a location sensor mounted on the moving body to detect the estimated location information, wherein the estimated location information is regarding a location estimated as a current location of the moving body when the image data is obtained; and an area estimator configured to estimate a partial area in the image shown by the image data as a predetermined feature existing area in which the predetermined feature exists, based on the vector information related to a specific point near to a position indicated by the obtained estimated location information, wherein the locator analyzes image data of the predetermined feature existing area in the obtained image data to identify the location of the predetermined feature in the image, and specifies the location of the moving body, based on the identified location of the predetermined feature, the estimated location information and the vector information. The location specifying apparatus of this aspect estimates a partial area in the image as the predetermined feature existing area, analyzes the image data of the predetermined feature existing area to identify the location of the predetermined feature, and specifies the location of the moving body. Compared with a configuration that analyzes the image data with regard to the entire area in the image, this configuration reduces the processing load of the location specifying apparatus. Accordingly this aspect shortens the time required for specifying the location of the vehicle.

The location specifying apparatus of the above aspect may further comprise a receiver configured to receive a reflected wave, in order to obtain the image data ahead of the moving body; and a second vector information storage unit configured to store information regarding a second vector connecting a location of the location sensor with a location of the receiver. The specific point-relevant location may be an absolute position of each specific point. The area estimator may be configured to specify a third vector connecting the location indicated by the obtained estimated location information with the position of each specific point; specify a fourth vector connecting the location of the receiver with the location of the predetermined feature when the image data is obtained, by using the first vector, the second vector and the third vector; and estimate the predetermined feature existing area, based on the fourth vector. The location specifying apparatus of this aspect specifies the fourth vector connecting the location of the receiver and the location of the predetermined feature when the image data is obtained, and estimates the predetermined feature existing area based on the fourth vector. This aspect enables the area where the predetermined feature exists to be estimated in the image with high accuracy.

In the location specifying apparatus of the above aspect, the second vector information storage unit may store a plurality of vectors according to different types of the moving bodies, as the second vector. The location specifying apparatus of this aspect stores a plurality of vectors according to the different types of the moving bodies as the second vector and thereby selectively uses the vector to be used as the second vector according to the type of the moving body on which the location specifying apparatus is mounted. This configuration uses the vector suitable for the actual locations of the location sensor and the receiver in the moving body, as the second vector. This aspect thus enables the location of the moving body to be specified with higher accuracy.

The location specifying apparatus of the above aspect may further comprise a receiver configured to receive a reflected wave, in order to obtain the image data ahead of the moving body. The specific point-relevant location may be a location of the receiver when the receiver is located at a predetermined position above each specific point. The area estimator may identify a first vector related to a specific point nearest to the location indicated by the estimated location information, and may estimate the predetermined feature existing area based on the identified first vector. The first vector related to the specific point nearest to the location indicated by the estimated location information is more approximate to a vector connecting the location of the receiver with the location of the predetermined feature at the actual current location of the moving body, compared with the first vectors related to the other specific points. Accordingly, the location specifying apparatus of this aspect ensures estimation of the predetermined feature existing area with high accuracy.

In the location specifying apparatus of the above aspect, the locator may specify a fifth vector connecting the identified location of the predetermined feature with the location indicated by the estimated location information. The locator may identify a first vector most approximate to the specified fifth vector out of the first vectors related to the plurality of specific points, and may specify the location of the moving body based on a position of a specific point related to the identified first vector. The first vector related to the specific point nearer to the current location of the moving body is more likely to be approximate to the fifth vector. Accordingly the location specifying apparatus of this aspect enables the location of the moving body to be specified with high accuracy.

In the location specifying apparatus of the above aspect, the image data acquirer may obtain a plurality of image data at different times. The area estimator may estimate the predetermined feature existing area with respect to each of a plurality of images shown by the plurality of image data, such that with respect to an image shown by image data obtained at a later time, an area nearer to an edge of the image is estimated as the predetermined feature existing area. In general, the location of the predetermined feature in the image becomes closer to the edge of the image with a decrease in distance from the predetermined feature. Accordingly the location specifying apparatus of this aspect ensures estimation of the predetermined feature existing area with higher accuracy.

In the location specifying apparatus of the above aspect, the image data acquirer may obtain a plurality of image data at different times. The area estimator may estimate the predetermined feature existing area with respect to each of a plurality of images shown by the plurality of image data, such that with respect to an image shown by image data obtained at a later time, a smaller area is estimated as the predetermined feature existing area. In general, the location of the predetermined feature in the image becomes closer to the edge of the image with a decrease in distance from the predetermined feature. It is accordingly reasonable that a narrower (smaller) area nearer to the edge of the image is estimated as the predetermined feature existing area, with respect to the image obtained at the later time. The location specifying apparatus of this aspect estimates the smaller area as the predetermined feature existing area with respect to the image obtained at the later time and thereby further reduces the processing load for analysis of the image data.

The location specifying apparatus of the above aspect may further comprise a shape information storage unit configured to store shape information regarding a shape of the predetermined feature specified by a reflected wave from the predetermined feature. The first vector information storage unit may store a relevant angle associated with an angle between a representative surface of the predetermined feature and the first vector, related to the position information regarding the position of the specific point, in addition to the vector information. The locator may correct at least one of a shape of a feature in image data of the predetermined feature existing area and the shape of the predetermined feature shown by the shape information stored in the shape information storage unit, based on the relevant angle, and may identify a location of the predetermined feature in the image using a corrected shape. In general, the shape of the predetermined feature specified by the reflected wave differs at different points. The location specifying apparatus of this aspect, however, corrects at least one of the shape of the feature in the image data of the predetermined feature existing area and the shape of the predetermined feature shown by the shape information stored in the shape information storage unit, based on the relevant angle associated with the angle between the representative surface of the predetermined feature and the first vector, and identifies the location of the predetermined feature in the reflected wave image using the corrected shape. This configuration enables the location of the predetermined feature to be identified with high accuracy, irrespective of the location of the vehicle.

According to another aspect of the disclosure, there is provided a non-transitory computer-readable medium that has encoded thereon a data structure that includes at least one data table storing vector information executed in a process of specifying a location of a moving body. In the non-transitory computer-readable medium the vector information regarding a vector connecting a specific point-relevant location, which is associated with each of a plurality of specific points set along a road, with a location of a predetermined feature is related to position information regarding a positions of the specific point.

The invention claimed is:

1. A location calculation system comprising:
    circuitry configured to:
    store vector information regarding a plurality of first vectors each connecting a specific point-relevant location, that is associated with each of a plurality of specific points set along a road, with a location of a predetermined feature, in relation to position information regarding each position of the plurality of specific points;
    store predetermined feature location information regarding the location of the predetermined feature;
    obtain image data ahead of a moving body;
    calculate a location of the predetermined feature in an image of the image data as obtained by the circuitry;
    calculate a location of the moving body based on the location of the predetermined feature as calculated by the circuitry and the vector information; and
    output the location of the moving body as calculated by the circuitry.

2. The location calculation system according to claim 1, wherein the circuitry is configured to:
    obtain estimated location information of the moving body from a location sensor mounted on the moving body to detect the estimated location information, the estimated location information indicating a location estimated as a current location of the moving body when the image data is obtained;
    estimate a partial area in the image of the image data as a predetermined feature existing area in which the predetermined feature would exist, based on the vector information related to a specific point of the plurality of specific points near to a position indicated by the estimated location information;
    analyze image data of the predetermined feature existing area in the image data as obtained by the circuitry to calculate the location of the predetermined feature in the image; and
    calculate the location of the moving body based on the location of the predetermined feature as calculated by the circuitry, the estimated location information, and the vector information.

3. The location calculation system according to claim 2, wherein the circuitry is configured to:
    store information regarding a second vector connecting a location of the location sensor with a location of a receiver configured to receive a reflected wave in order to obtain the image data ahead of the moving body;
    calculate a third vector connecting a location indicated by the estimated location information with a position of each of the plurality of specific points, which is the specific point-relevant location;
    calculate a fourth vector connecting the location of the receiver with the location of the predetermined feature when the image data is obtained, based on the first vector, the second vector and the third vector; and
    calculate the predetermined feature existing area based on the fourth vector.

4. The location calculation system according to claim 3, further comprising:
    a receiver that receives a reflected wave in order to obtain the image data ahead of the moving body.

5. The location calculation system according to claim 4, wherein
    the circuitry stores, as the second vector, a plurality of vectors according to different types of the moving body.

6. The location calculation system according to claim 2, wherein
    the specific point-relevant location is a location of a receiver configured to receive a reflected wave in order to obtain the image data ahead of the moving body when the receiver is located at a predetermined position above each of the plurality of the specific points, and
    the circuitry identifies a vector related to a specific point of the plurality of the specific points nearest to the location indicated by the estimated location information from among the plurality of the first vectors, and estimates the predetermined feature existing area based on the first vector as identified by the circuitry.

7. The location calculation system according to claim 2, wherein
    the circuitry is configured to:
    calculate a fifth vector connecting the location of the predetermined feature as calculated by the circuitry with the location indicated by the estimated location information;
    identify a vector most approximate to the specified fifth vector from among the plurality of the first vectors; and
    calculate the location of the moving body based on a position of a specific point of the plurality of the specific points related to the vector as identified by the circuitry.

8. The location calculation system according to claim 2, wherein
    the circuitry is configured to:
    obtain a plurality of the image data at different times; and
    estimate the predetermined feature existing area with respect to each of a plurality of images of the plurality of image data, such that with respect to an image of the image data obtained at a later time, an area nearer to an edge of the image is estimated as the predetermined feature existing area.

9. The location calculation system according to claim 2, wherein the circuitry is configured to:
obtain a plurality of the image data at different times; and
estimate the predetermined feature existing area with respect to each of a plurality of images of the plurality of image data, such that with respect to an image of image data obtained at a later time, a smaller area is estimated as the predetermined feature existing area.

10. The location calculation system according to claim 1, wherein
the circuitry is configured to:
store shape information regarding a shape of the predetermined feature specified by a reflected wave from the predetermined feature;
store a relevant angle information associated with an angle between a representative surface of the predetermined feature and the first vector, in relation to the position information regarding each position of the plurality of specific points, in addition to the vector information;
correct at least one of a shape of a feature in the image data of the predetermined feature existing area and a shape of the predetermined feature of the shape information, based on the relevant angle; and
identify a location of the predetermined feature in the image using the shape as corrected by the circuitry.

11. The location calculation system according to claim 1, further comprising:
a location sensor mounted on the moving body that detects an estimated location information of the moving body.

12. The location calculation system according to claim 1, wherein
the predetermined feature is a sign on the road.

13. The location calculation system according to claim 8, wherein
the circuitry is configured to store an amount of shift between the predetermined feature existing areas at different times according to a speed of the moving body.

14. The location calculation system according to claim 13, wherein
the circuitry is configured to increase the amount of shift as a current speed of the moving body increases.

15. The location calculation system according to claim 1, further comprising:
a laser scanner that emits a laser pulse and receives a reflected wave of the laser pulse to measure at least one of a distance, a horizontal angle and a vertical angle of the predetermined feature relative to a position of the laser scanner.

16. The location calculation system according to claim 15, wherein
the circuitry is configured to calculate a fourth vector connecting the location of a receiver configured to receive a reflected wave in order to obtain the image data ahead of the moving body with the location of the predetermined feature when the image data is obtained, based on the distance, the horizontal angle and the vertical angle.

17. A non-transitory computer-readable medium including executable instructions, which when executed by circuitry cause the circuitry to:
store vector information regarding a plurality of first vectors each connecting a specific point-relevant location, that is associated with each of a plurality of specific points set along a road, with a location of a predetermined feature, in relation to position information regarding each position of the plurality of specific points;
store predetermined feature location information regarding the location of the predetermined feature;
obtain image data ahead of a moving body;
calculate a location of the predetermined feature in an image of the image data as obtained by the circuitry;
calculate a location of the moving body based on the location of the predetermined feature as calculated by the circuitry and the vector information; and
output the location of the moving body as calculated by the circuitry.

* * * * *